(12) United States Patent
Wang et al.

(10) Patent No.: US 10,097,458 B2
(45) Date of Patent: Oct. 9, 2018

(54) NETWORK CONTROL METHOD, NETWORK SYSTEM, APPARATUS, AND PROGRAM

(71) Applicant: NEC Corporation, Tokyo (JP)

(72) Inventors: Longjiang Wang, Tokyo (JP); Yoji Suzuki, Tokyo (JP); Masanori Takashima, Tokyo (JP); Keisuke Torigoe, Tokyo (JP)

(73) Assignee: NEC Corporation, Tokyo (JP)

( * ) Notice: Subject to any disclaimer, the term of this patent is extended or adjusted under 35 U.S.C. 154(b) by 92 days.

(21) Appl. No.: 15/120,367

(22) PCT Filed: Feb. 18, 2015

(86) PCT No.: PCT/JP2015/054372
§ 371 (c)(1),
(2) Date: Aug. 19, 2016

(87) PCT Pub. No.: WO2015/125801
PCT Pub. Date: Aug. 27, 2015

(65) Prior Publication Data
US 2017/0085479 A1 Mar. 23, 2017

(30) Foreign Application Priority Data
Feb. 19, 2014 (JP) ................................. 2014-029906

(51) Int. Cl.
*H04L 12/741* (2013.01)
*H04L 12/701* (2013.01)
(Continued)

(52) U.S. Cl.
CPC .......... *H04L 45/745* (2013.01); *H04L 45/00* (2013.01); *H04L 45/54* (2013.01); *H04L 45/64* (2013.01);
(Continued)

(58) Field of Classification Search
CPC ..... H04L 12/70; H04L 12/721; H04L 12/723; H04L 12/741; H04L 12/935;
(Continued)

(56) References Cited

U.S. PATENT DOCUMENTS 7,212,529 B2   5/2007 Yamano
7,379,454 B2   5/2008 Ogasawara et al.
(Continued)

FOREIGN PATENT DOCUMENTS

CN     103428094 A      12/2013
EP     2908483 A1 *     8/2015      ......... H04L 12/4625
(Continued)

OTHER PUBLICATIONS

Japanese Office Action issued by the Japan Patent Office for Japanese Application No. 2016-504118 dated Jul. 4, 2017 (8 pages).
(Continued)

*Primary Examiner* — Tri H Phan
(74) *Attorney, Agent, or Firm* — Wilmer Cutler Pickering Hale and Dorr LLP

(57) ABSTRACT

A switch includes at least a first table and a second table different in mapping of egress information of a network and user information to a packet. The first table is searched for a first packet received and operation according to an action corresponding to a search key of the first table is applied to the first packet to convert the first packet to a second packet. The second packet is supplied to the second table. The second table is then searched for the second packet. When the search key of the second table is matched, the operation according to the action corresponding to the search key of the second table is applied to the second packet to convert the second packet to a third packet (refer to FIG. 5).

12 Claims, 20 Drawing Sheets

(51) Int. Cl.
*H04L 12/715* (2013.01)
*H04L 12/46* (2006.01)
*H04L 12/725* (2013.01)

(52) U.S. Cl.
CPC ........ *H04L 12/4645* (2013.01); *H04L 45/308* (2013.01)

(58) Field of Classification Search
CPC ... H04L 12/4645; H04L 45/00; H04L 45/308; H04L 45/745; H04L 45/54; H04L 45/64
See application file for complete search history.

(56) References Cited

U.S. PATENT DOCUMENTS

| | | | |
|---|---|---|---|
| 8,098,662 | B2 | 1/2012 | Prakash et al. |
| 8,134,952 | B2 | 3/2012 | Prakash et al. |
| 8,259,702 | B2 | 9/2012 | Prakash et al. |
| 8,416,751 | B2 | 4/2013 | Prakash et al. |
| 8,971,338 | B2 | 3/2015 | Mishra et al. |
| 9,608,908 | B2 * | 3/2017 | Yoshida .............. H04L 12/4666 |
| 9,769,064 | B2 | 9/2017 | Suemitsu |
| 9,819,584 | B2 * | 11/2017 | Takashima ............ H04L 45/745 |
| 2003/0026260 | A1 | 2/2003 | Ogasawara et al. |
| 2003/0095548 | A1 | 5/2003 | Yamano |
| 2007/0286142 | A1 | 12/2007 | Prakash et al. |
| 2007/0286151 | A1 | 12/2007 | Prakash et al. |
| 2007/0286152 | A1 | 12/2007 | Prakash et al. |
| 2008/0008111 | A1 | 1/2008 | Prakash et al. |
| 2013/0176850 | A1 | 7/2013 | Mishra et al. |
| 2014/0229945 | A1 * | 8/2014 | Barkai .................... H04L 49/70 718/1 |
| 2015/0016450 | A1 | 1/2015 | Suemitsu |
| 2015/0341266 | A1 * | 11/2015 | Ogawa ................ H04L 12/2876 370/392 |
| 2016/0006663 | A1 * | 1/2016 | Zhang .................... H04L 47/33 709/234 |
| 2016/0234097 | A1 | 8/2016 | Chang |
| 2016/0373364 | A1 * | 12/2016 | Yokota ................ H04L 12/6418 |
| 2017/0034058 | A1 * | 2/2017 | Sampath ............. H04L 12/6418 |
| 2017/0134277 | A1 * | 5/2017 | Bifulco ................. H04L 45/745 |

FOREIGN PATENT DOCUMENTS

| | | | |
|---|---|---|---|
| EP | 3110085 A1 * | 12/2016 | ............ H04L 45/00 |
| JP | H03-019452 A | 1/1991 | |
| JP | 2002-271370 A | 9/2002 | |
| JP | 2003-051843 A | 2/2003 | |
| JP | 2003-152782 A | 5/2003 | |
| JP | 2005-333220 A | 12/2005 | |
| RU | 2413377 C2 | 2/2011 | |
| WO | WO-2012/111222 A1 | 8/2012 | |
| WO | WO-2013/105009 A1 | 7/2013 | |
| WO | WO-2013/141200 A1 | 9/2013 | |
| WO | WO-2013/168737 A1 | 11/2013 | |
| WO | WO-2015/021881 A1 | 2/2015 | |
| WO | WO 2017167359 A1 * | 10/2017 | |

OTHER PUBLICATIONS openflow.org, "OpenFlow Switch Specification," Version 1.1.0 Implemented, 4.1.1 Pipeline Processing, pp. 5-6, retrieved online from URL http://www.openflow.org/documents/openflow-spec-v1.1.0.pdf, 2 pages (Feb. 28, 2011).

Tamura, Nao, "Easiest discussions about SDN in the world, Part 3, Ideality and actuality of SDN," Nikkei Network, Japan, Nikkei BP, No. 157, pp. 42-46, 6 pages (Apr. 28, 2013).

International Search Report corresponding to PCT/JP2015/054372, dated May 12, 2015 (5 pages).

Kapil Bakshi, Considerations for Software Defined Networking (SDN): Approaches and Use Cases, Cisco Systems, Inc., 2013 IEEE (9 pages).

Nao Tamura "Sekai de Ichiban Wakariyasui SDN," Nikkei Network, vol. 28, No. 157, May 2013 (8 pages).

Russian Office Action issued by the Russian Intellectual Property Office for Russian Application No. 2016137133 dated Oct. 17, 2017 (12 pages).

Extended European Search Report issued by the European Patent Office for European Application No. 15752215.2 dated Sep. 21, 2017 (11 pages).

Open Networking Foundation, "OpenFlow Switch Specification," Version 1.4.0 (Wire Protocol 0x05), 205 pages (Oct. 14, 2013).

* cited by examiner

FIG. 6

| | Table1 | Table2 | Table3 |
|---|---|---|---|
| MODE 1 | Table 1-1:<br>Key:<br>① LOCAL USER INFORMATION<br>Action:<br>① REWRITE INTO GLOBAL USER INFORMATION<br>(GLOBAL USER INFORMATION IS NOT TEMPORARILY STORED) | Table 2-1: Key:<br>① PACKET ADDRESS INFORMATION<br>② GLOBAL USER INFORMATION<br>Action:<br>① ADD (encap) DESTINATION INFORMATION HEADER | Table 3: Key:<br>① DESTINATION INFORMATION<br>Action:<br>① DETERMINE OUTPUT DESTINATION |
| MODE 2 | | Table 2-2: Key:<br>① PACKET ADDRESS INFORMATION<br>② GLOBAL USER INFORMATION<br>Action:<br>① ADD (encap) DESTINATION INFORMATION HEADER<br>② DETERMINE OUTPUT DESTINATION | NONE |
| MODE 3 | Table 1-2:<br>Key:<br>① LOCAL USER INFORMATION<br>Action:<br>① REWRITE INTO GLOBAL USER INFORMATION<br>② TEMPORARILY STORE GLOBAL USER INFORMATION | Table 2-3: Key:<br>① PACKET ADDRESS INFORMATION<br>② TEMPORARILY STORED GLOBAL USER INFORMATION<br>Action:<br>① ADD (encap) DESTINATION INFORMATION HEADER | Table 3: Key:<br>① DESTINATION INFORMATION<br>Action:<br>① DETERMINE OUTPUT DESTINATION |
| MODE 4 | | Table 2-4: Key:<br>① PACKET ADDRESS INFORMATION<br>② TEMPORARILY STORED GLOBAL USER INFORMATION<br>Action:<br>① ADD (encap) DESTINATION INFORMATION HEADER<br>② DETERMINE OUTPUT DESTINATION | NONE |

NETWORK CONTROL METHOD, NETWORK SYSTEM, APPARATUS, AND PROGRAM

REFERENCE TO RELATED APPLICATIONS

This application is a national stage application of International Application No. PCT/JP2015/054372, filed on Feb. 18, 2015, which claims the benefit of priority to Japanese patent application No. 2014-029906, filed on Feb. 19, 2014, the disclosures of each which are incorporated herein in their entirety by reference.

TECHNICAL FIELD

The present invention relates to a network control method, a network system, an apparatus, and a program.

BACKGROUND

In a related art network system, an action of each of switches respectively located at an ingress and an egress of a network is implemented as an action (Action) resulted from a search of a single table. That is, each of the above-mentioned switches, searches the table having entries each including a search key, an action, and so forth with respect to an input packet, and performs an operation specified in an action field corresponding to the key that matches (match) header information of the packet.

The table at the above-mentioned switch includes entries each includes three types of information of {Search key, Action, and Statistical Information}. Though no particular limitation is imposed, an outline of {Search key, Action, and Statistical information} is as follows.

TABLE 1

| | |
|---|---|
| Search Key | Matching is Possible by Using Combination of Arbitrary Header Information for Layer 1 (L1) to Layer 4 (L4): Ingress port (Physical Port Number of Switch:L1)/Src MAC (Transmission Source MAC (Media Access Control) Address:L2)/Dst MAC (Destination MAC Address:L2)/Ether type (Type of Ethernet (Registered Trademark):L2)/VLAN ID (Virtual Local Area Network ID:L2)/VLAN priority (Value of VLAN PCP (Priority Code Point) (CoS (Class Of Service)):L2)/Src IP (Transmission Source IP (Internet Protocol) Address:L3)/Dst IP(Destination IP Address:L3)/IP protocol (IP Protocol Type)/IP ToS (Upper 6 bits) (ToS (Type Of Service:1 Byte) Information of IP)/Src Port (TCP (Transmission Control Protocol)/Transmission Source Port Number of UDP (User Datagram Protocol):L4)/Dst Port (Destination Port Number of TCP/UDP:L4) |
| Action | Packet Relay/Discard, Rewriting of Header Information, or the Like is Possible: Forward (Output from a Physical Port)/All(Output from Any Port Except Input Port)/Controller (Output to Controller)/Local (Output to Local Stack of Own Apparatus)/Table (Output According to Content in OpenFlow Table)/In_port (Output from Input Port)/Normal (Output Using Content in Legacy Table)/Flood (Output from Any Port Except Input Port and Block Port of Spanning Tree)/Drop (Discard Packet)/Modify-Field (Rewriting of Packet Header Information: VLAN ID, Vlan priority, Src MAC, Dst MAC, Src IP, Dst IP, IP Tos, Src Port, and Dst Port are Rewritable) |
| Statistical Information | Various Types of Statistics are Obtainable for Each Table, for Each flow, for Each Physical Port, and for Each Queue (Queue) |

As packet header conversion based on referencing of tables, Patent Literature 1 discloses a configuration for autonomously controlling, by hardware, each internal path which is set in an IP-over-ATM (Asynchronous Transfer Mode) switch. Based on a combination of destination information detected by destination information detection means and input source information, internal conversion means in each sub-unit on an input side searches an internal path table for information including a corresponding internal path identifier. The internal conversion means converts a header included in a series of ATM cells by using the information (including a corresponding internal path identifier) and supplies the converted header to a switch circuit. At each sub-unit on an output side, conversion management means prepares a header conversion table based on the information concerning paths between respective nodes and uses the header conversion table for a header conversion process by header conversion means.

As a configuration including a plurality of tables, Patent Literature 2 discloses a configuration in which a routing information table is constituted from a plurality of sub-tables in a packet forwarding apparatus configured to forward an input packet to an output line specified by a routing processing unit, for example. Each sub-table includes an entry of a first format indicating routing information. At least one of the sub-tables includes, in addition to the entry of the first format, an entry of a second format specifying a different sub-table to be referred to. When the routing processing unit refers to the sub-table specified by an input line interface and the entry of the second format is retrieved, the routing processing unit refers to the different sub-table specified by the entry, thereby executing routing and header conversion of the input packet.

Further, as a configuration including a plurality of tables arranged in multiple stages, Patent Literature 3 discloses a configuration in which a header extraction and search method determination unit generates a search key from header information of a packet, in response to an address search instruction. In this configuration, when a multiple-stage table search unit searches a plurality of address information tables using the search key to detect presence of an internal header, the multiple-stage table search unit transmits an internal header extraction instruction to the header extraction and search method determination unit. The multiple-stage table search unit searches a corresponding one of the address information tables using a search key to transmit information on header addition or deletion to a header conversion unit. The header conversion unit performs a process of the header addition or deletion for the packet and transmits a packet transmission instruction to a packet transmission unit.

Patent Literature 4 discloses a network node apparatus including a forwarding table, an address conversion table, and a routing information table. One memory address is retrieved from the forwarding table, using the destination address of a received packet as a search key, and routing information is retrieved from the routing information table, based on an entry address obtained by conversion by the address conversion table.

Patent Literature 5, there is disclosed a self-routing type switching equipment including a label conversion circuit including a plurality of tables to rewrite a content of a packet header portion.

CITATION LIST

Patent Literature

[PTL 1]
JP Patent Kokai Publication No. JP2002-271370A
[PTL 2]
JP Patent Kokai Publication No. JP2003-051843A
[PTL 3]
JP Patent Kokai Publication No. JP2003-152782A
[PTL 4]
JP Patent Kokai Publication No. JP2005-333220A
[PTL 5]
JP Patent Kokai Publication No. JP-H03-0194-452A

SUMMARY

Analysis of the related art will be given below.

In a virtualized network, for example, the following packet conversion is performed at an ingress/egress of a management network to be controlled.

<Ingress>: An original packet (packet received at the ingress) is converted into a format including the following information:
 egress information of the network;
 global user information of the packet; and
 original information of the packet.

<Egress>: The packet converted at the ingress is returned to its original format and is output to an outside.

Herein, local user information means information that is closed within one switch, such as a VLAN ID. Global user information means unique information to be shared by an entirety of the network, such as a VNI (VXLAN Network Identifier) for a VXLAN (Virtual eXtensible Local Area network). The VXLAN is a protocol for constructing (overlaying by tunnel communication) a logical L2 network (VXLAN Overlay Segment) over an L3 network by encapsulating ("encapsulate" is also abbreviated as "encap": addition of a header) an original Ethernet (trade name) frame by a VXLAN header, as illustrated in FIG. 20. A VNI (or referred to as a "VXLAN Segment ID"), which is an ID of 24 bits included in the VXLAN header is employed for identifying each logical network. The L2 network can be constructed across a boundary of the L3 network by performing tunneling between VTEPs (VXLAN Tunnel Endpoints) of virtual switches or the like that is implemented on a hypervisor or the like. A UDP header to be added by UDP encapsulation includes a transmission source port number, a destination port number, a length, and a checksum (this transmission source port number is calculated by hashing, based on the value of a specific field of an Inner header). An IP header to be added includes a transmission source IP address (Source IP address) and a destination IP address (Destination IP address).

Though no particular limitation is imposed, the following describes an example using the VXLAN. In the VXLAN, the following conversion is performed at each of ingress and egress of a management network, for example.

At the ingress of the management network, encapsulation (encap) with the following items of information is performed:
 egress information of a network: Outer_DstIP (outer destination IP address: Outer_DstIP: Outer Destination IP address);
 global user information of a packet: VNI
 original information of the packet: a UDP packet (refer to UDP in FIG. 2).

At the egress of the management network, the Outer information (Outer header) added at the ingress is decapsulated ("decapsulate" is also abbreviated as "decap2, meaning that a header added by encapsulation is deleted) to return the packet to its original format (global user information needs to be restored to local user information, depending on a network).

When the conversion at the ingress is performed according to actions in a single table as in the example of the VXLAN, action patterns are given by:

(the number of egress information items of a management network)×(the number of user information items of a packet).

When it is assumed that the number of egress information items of a management network=100 and the number of user information items of a packet=4K (K is an abbreviation of kilo: 1024), for example, the number of action resources that are necessary becomes 100×4K. That is, an action that allows the packet to be output to 100 egresses is necessary for each global user. Thus, when the number of the users is 4K, it is necessary to hold 100×4K action resources (number of action entries in a single table).

Further, when the global user information is restored to the local user information at the egress of the management network as well, a problem which is similar to that mentioned above may occur. When the conversion at the egress is performed according to actions in a single table, action patterns are given by:

(the number of final egress information items)×(the number of user information items).

As mentioned above, accommodation of a lot of action resources in the single table is needed. As a result, a capacity of a storage device for storing the table increases, so that a problem arises, also in terms of an increase in a circuit area and power consumption and performance of processing for a search key matching.

The present invention has therefore been invented in view of the issues mentioned above. It is an object of the present invention to provide a method, a system, and an apparatus that allow reduction of necessary action patterns and expansion of accommodation of action resources when an operation at an ingress/egress of a network can be implemented as an action obtained by table searching.

According to one aspect (first aspect) of the present invention, there is provided a network control method comprising:

preparing in a switch a plurality of stages of tables that include at least a first table and a second table and that are different to each other in mapping of egress information of a network and user information to a packet, the table being searched whether predetermined information of a packet matches a search key of an entry in the table to perform an operation defined in an action corresponding to the search key matched;

searching the first table for a first packet received, applying to the first packet an operation according to an action corresponding to a search key in the first table to convert the first packet to a second packet, when the first packet matches the search key in the first table, and supplying the second packet to the second table; and searching the second table for the second packet, applying to the second packet an operation according to an action corresponding to a search key in the second table to convert the second packet to a third packet, when the second packet matches the search key in the second table.

According to another aspect (second aspect) of the present invention, there is provided a network system comprising at least one switch including a plurality of stages of tables that includes at least a first table and a second table and that are different in mapping of egress information of a network and user information to a packet, the table being searched whether predetermined information of a packet matches a search key of an entry in the table to perform an operation defined in an action corresponding to the search key matched, wherein the switch searches the first table for a first packet received, applies to the first packet an operation according to an action corresponding to a search key of the first table to convert the first packet to a second packet when first packet matches the search key of the first table, and supplies the second packet to the second table, and wherein the switch searches the second table for the second packet and applies to the second packet an operation according to an action corresponding to a search key of the second table to convert the second packet to a third packet, when the second packet matches the search key of the second table.

According to yet another aspect (third aspect) of the present invention, there is provided a switch apparatus comprising a plurality of stages of tables including at least a first table and a second table and being mutually different in mapping of egress information of a network and user information with respect to a packet, wherein searching whether predetermined information of the packet matches a search key of an entry in the table is performed and an operation defined by an action corresponding to the matched search key is performed; wherein the switch apparatus searches the first table with respect to a first packet that has been received, applies to the first packet an operation according to an action corresponding to the search key of the first table to convert the first packet to a second packet when the search key of the first table is matched, and supplies the second packet to the second table, and searches the second table with respect to the second packet and applies to the second packet an operation according to an action corresponding to the search key of the second table to convert the second packet to a third packet when the search key of the second table is matched.

According to still another aspect (fourth aspect) of the present invention, there is provided a program for a switch including a plurality of stages of tables that includes at least a first table and a second table and that are different in mapping of egress information of a network and user information to a packet, the table being searched whether predetermined information of a packet matches a search key of an entry in the table to perform an operation defined in an action corresponding to the search key matched, the program causing the switch to perform processing comprising:

searching the first table for a first packet received, applying to the first packet an operation according to an action corresponding to a search key of the first table to convert the first packet to a second packet when the first packet matches the search key of the first table; and searching the second table for the second packet and applying to the second packet an operation according to an action corresponding to a search key of the second table to convert the second packet to a third packet when the second packet matches the search key of the second table. According to yet another aspect (fifth aspect), there is provided a computer-readable storage medium such as a memory or a magnetic/optical storage device storing the program according to the fourth aspect.

According to the present invention, when an action at an ingress/egress of a network is implemented as the action resulted from searches of tables, the number of necessary action patterns can be reduced and accommodation of action resources can be expanded.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 6 is a table illustrating comparison among the first to fourth modes of tables in the ingress switch in the exemplary embodiment of the present invention.

PREFERRED MODES

Figure 1:
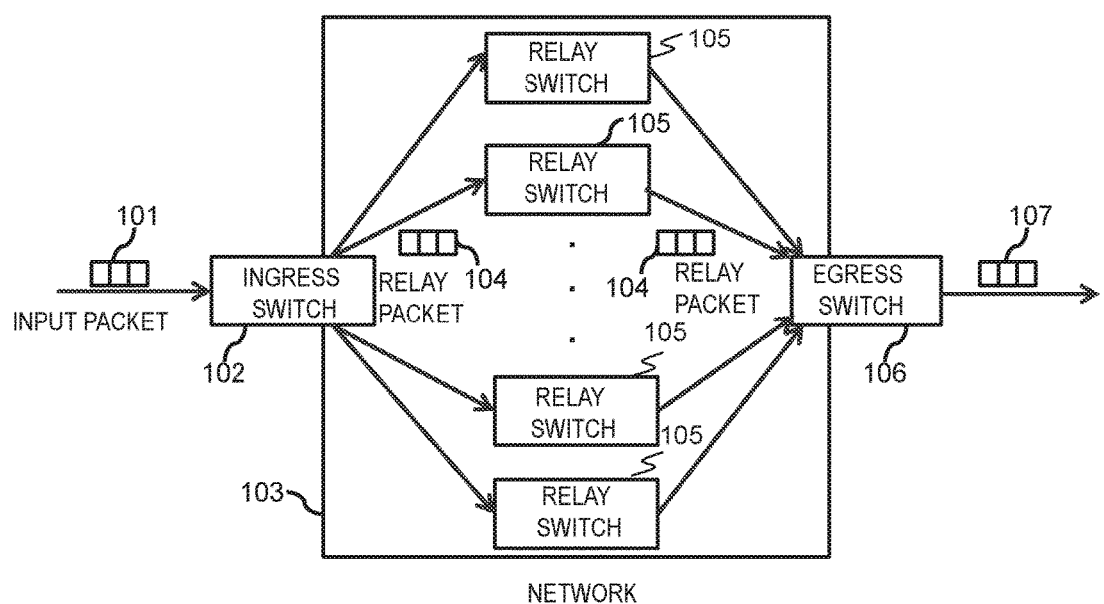
FIG. 1 is a diagram illustrating a table configuration of an ingress switch in an exemplary embodiment of the present invention.

Exemplary embodiments of the present invention will be described below. First, a basic concept of the present invention will be described. As described above, in the related art, an action at an ingress/egress of the network is implemented as an action resulted from search of a single table of a switch.

On contrast therewith, according to the present invention, processing (action) to be performed at an ingress/egress of a network is implemented as an action resulted from searches of a plurality of stages of tables. As a result, expansion of conditions for accommodation of actions can be implemented. More specifically, according to the present invention, as a table for which searching whether predetermined information of a packet matches a search key of an entry of the table is performed and an operation defined by an action corresponding to the search key matched is performed, a plurality of stages of tables are provided in a switch. The tables includes at least first and second tables (e.g., 123 and 130 in FIG. 5) that are different to each other in mapping of egress information of a network and user information with respect to a packet.

The first table is searched for a first packet received. When the first packet matches a search key of the first table, an operation according to an action corresponding to the search key of the first table is applied to the first packet to convert the first packet to a second packet. The second packet is then supplied to the second table. When the second packet matches a search key of the second table, an operation according to an action corresponding to the search key of the second table is applied to the second packet to convert the second packet to a third packet.

It may be so configured that in a switch on an ingress side of the network, local user information of the first packet is mapped to global user information, according to the first table, mapping from information of the second packet to destination information is performed according to the second table, and output is determined by the destination information of the third packet according to the third table arranged in a stage after the second table.

It may be so configured that in a switch on an egress side of the network, outer information of the first packet is decapsulated by referencing the outer information according to the first table to output the second packet;

(A) global user information of the second packet is mapped to local user information according to the second table; and a final destination is determined based on information of the second packet, for output, according to a third table arranged in a stage subsequent to the second table; or in an order reverse to (A), (B) the destination is determined based on global user information of the second packet, according to the third table; and then the global user information of the second packet is converted to a local user, according to the second table.

On a layer 2 (L2), a PDU (Protocol Data Unit) that is a unit for data forwarding is referred to as a frame, while on a layer 3 (L3), the PDU is referred to as a packet. In this specification, the PDU is written as the packet except when there is no particular need for making distinction between the frame and the packet.

When the conversion at the ingress is performed according to actions in the plurality of tables, action patterns are given by:

(the number of egress information items of a network)+(the number of user information items of a packet).

When it is assumed that the number of the egress information items of a network=100 and the number of user information items of a packet=4K (K=1024), the number of necessary action resources becomes 100+4K. When the tables are composed of two stages, the table in one of a prestage and a poststage may include 100 action resources, and the table in the other of the prestage and the poststage may include 4K action resources. That is, the number of action resources (the number of table entries=100×4K) in the case of the related art is reduced to about one-eightieth.

A description will be given with respect to this point, with reference to FIG. 5, for example. When a key in header information of a packet matches (Hits) a search key of an entry in a table 1-2 (123), a corresponding action is an operation of converting local user information to global user information. The action with respect to a table 2-4 (130) in a poststage is conversion of egress information of a network. Conversion of 100 items of network (management network) egress information is performed for each global user information from the table 1-2 (123), using the table 2-4 (130). When the number of global users is 4K (K=1024), conversion action of the egress information of a network of the global users can be shared. Thus, it is enough to have the number of action resources of 4K that is necessary for the table 1-2 (123) and to have the number of action resources of 100 that is necessary for the table 2-4 (130). Accordingly, the total number of action resources necessary for the table 1-2 (12) and the table 2-4 (130) becomes 4K+100.

According to the present invention, if the global user information is restored to the local user information at the egress as well, the same method as that at the ingress is applied at the egress as well. Action patterns are thus given by:

(final egress information items)+(user information items).

First Exemplary Embodiment

FIG. 1 is a diagram illustrating a configuration example of a network in a first exemplary embodiment of the present invention. Referring to FIG. 1, a network 103 includes two types of switches that are an ingress switch 102 and an egress switch 106 located at edges of the network 103 and relay switches 105 located in a core of the network 103. The ingress switch 102 and the egress switch 106 are disposed at the edges of the network 103, are each connected to a communication node (not illustrated) or the like outside the network 103, and are also referred to as "edge switches". The relay switches 105 are switches used for data forwarding and relay inside (e.g., at central portions of) the network 103, and are also referred to as "core switches".

An input packet 101 is a packet to flow into the network 103 from the communication node or the like (not illustrated) outside the network 103, and an output packet 107 is a packet to be output to an outside from the network 103. The input packet 101 is forwarded in the form of the relay packet 104 inside the network 103.

Each of the ingress switch 102 and the egress switch 106 implements an operation as an action resulted from searches of tables. Each of the ingress switch 102 and the egress switch 106 includes a storage unit (memory unit) configured to store and hold the tables and a control and processing unit (not illustrated). When each table stored in the storage unit is searched with respect to the packet supplied through an input port and predetermined information (key information) of the header of the packet matches a search key of an entry of the table, the control and processing unit executes an operation defined in an action field corresponding to the search key. The operation of the control and processing unit at each switch of the ingress switch 102 and the egress switch 106 may be executed by a processor configured to be implemented by a CPU (Central Processing Unit) (processor) included in the switch.

The ingress switch 102 in this exemplary embodiment is classified into four modes according to use mode of the tables. More specifically, the ingress switch 102 is classified into ingress switches as illustrated in FIG. 2, FIG. 3, FIG. 4, and FIG. 5, for example.

Figure 2:
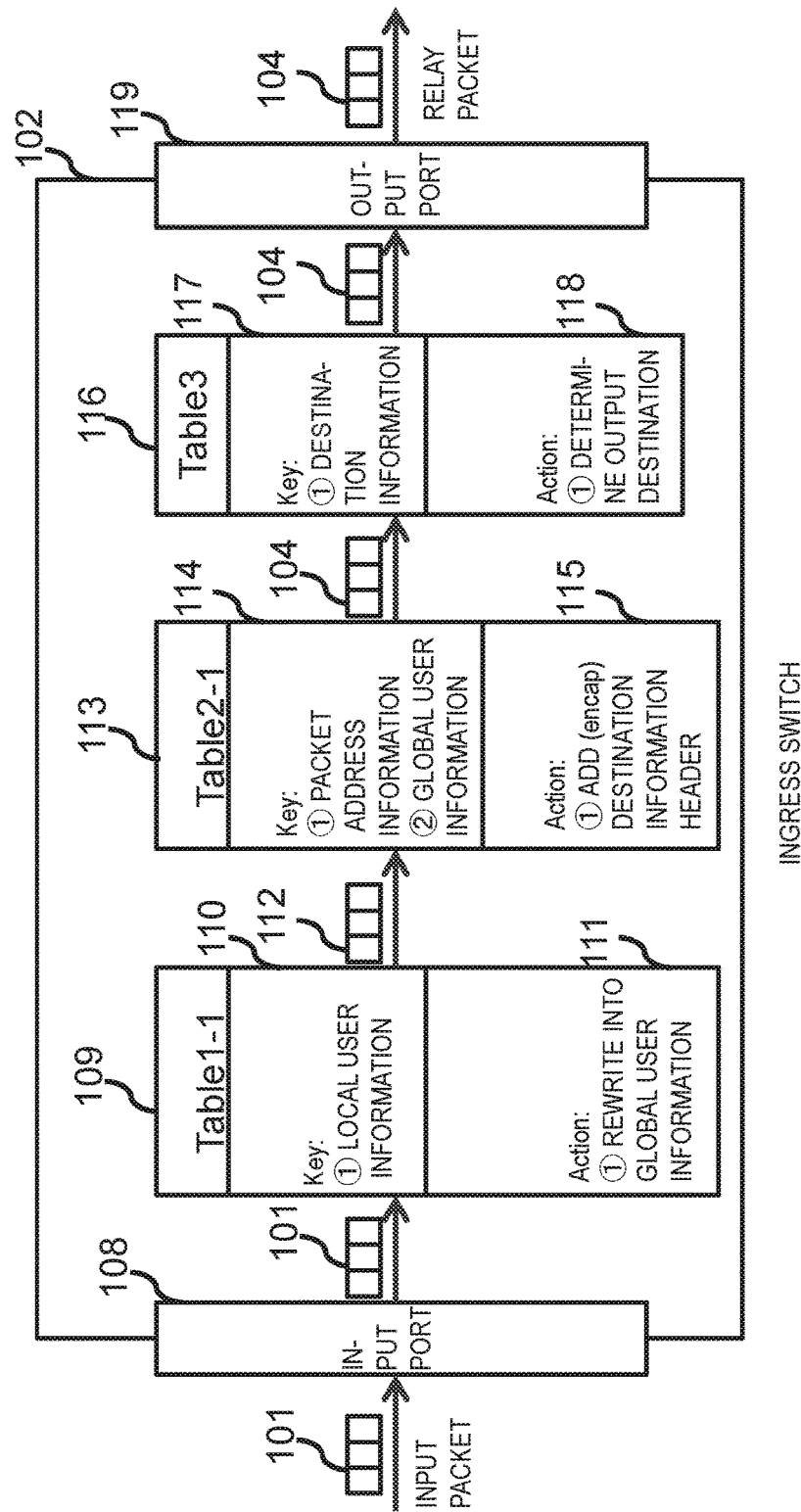
FIG. 2 is a diagram illustrating a first mode of tables in the ingress switch in the exemplary embodiment of the present invention.
Figure 3:
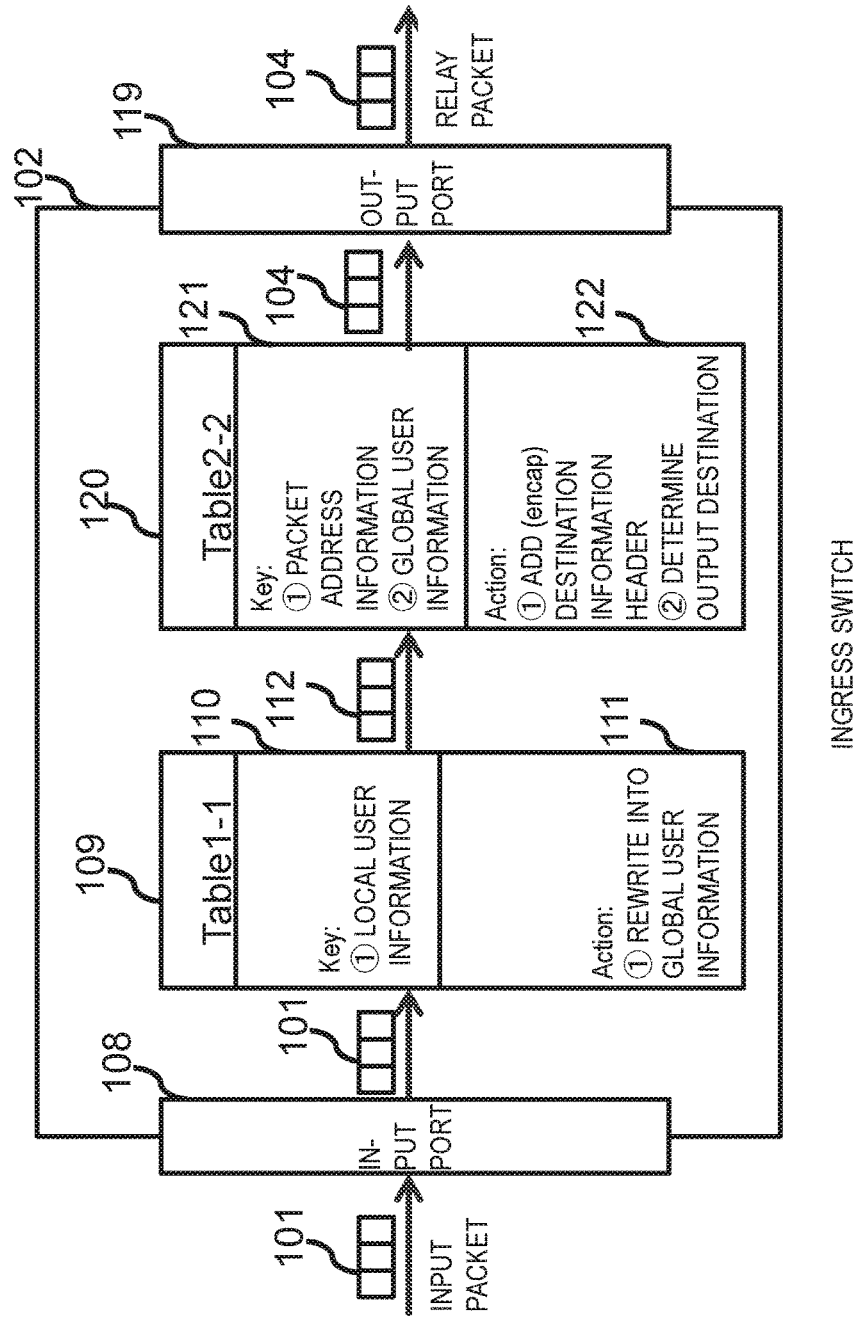
FIG. 3 is a diagram illustrating a second mode of tables in the ingress switch in the exemplary embodiment of the present invention.

Referring to each of FIG. 2 and FIG. 3, a packet parser (packet analyzer) is provided in a prestage of each table in the ingress switch 102. That is, parsing (analysis) of the packet is performed in the stage before execution of an action resulted from a search of each table. Herein, with respect to the input packet, for example, the packet parser is used for analysis of an Ethernet (registered trademark) frame, determination of the type of the packet, referring to a header tag field value such as a MAC address or an IP address, and so forth. An arbitrary known configuration is employed for the packet parser in this exemplary embodiment. On the other hand, a packet parser not illustrated is provided only immediately after an input port 108 of the ingress switch 102 in each of FIG. 4 and FIG. 5.

Figure 4:
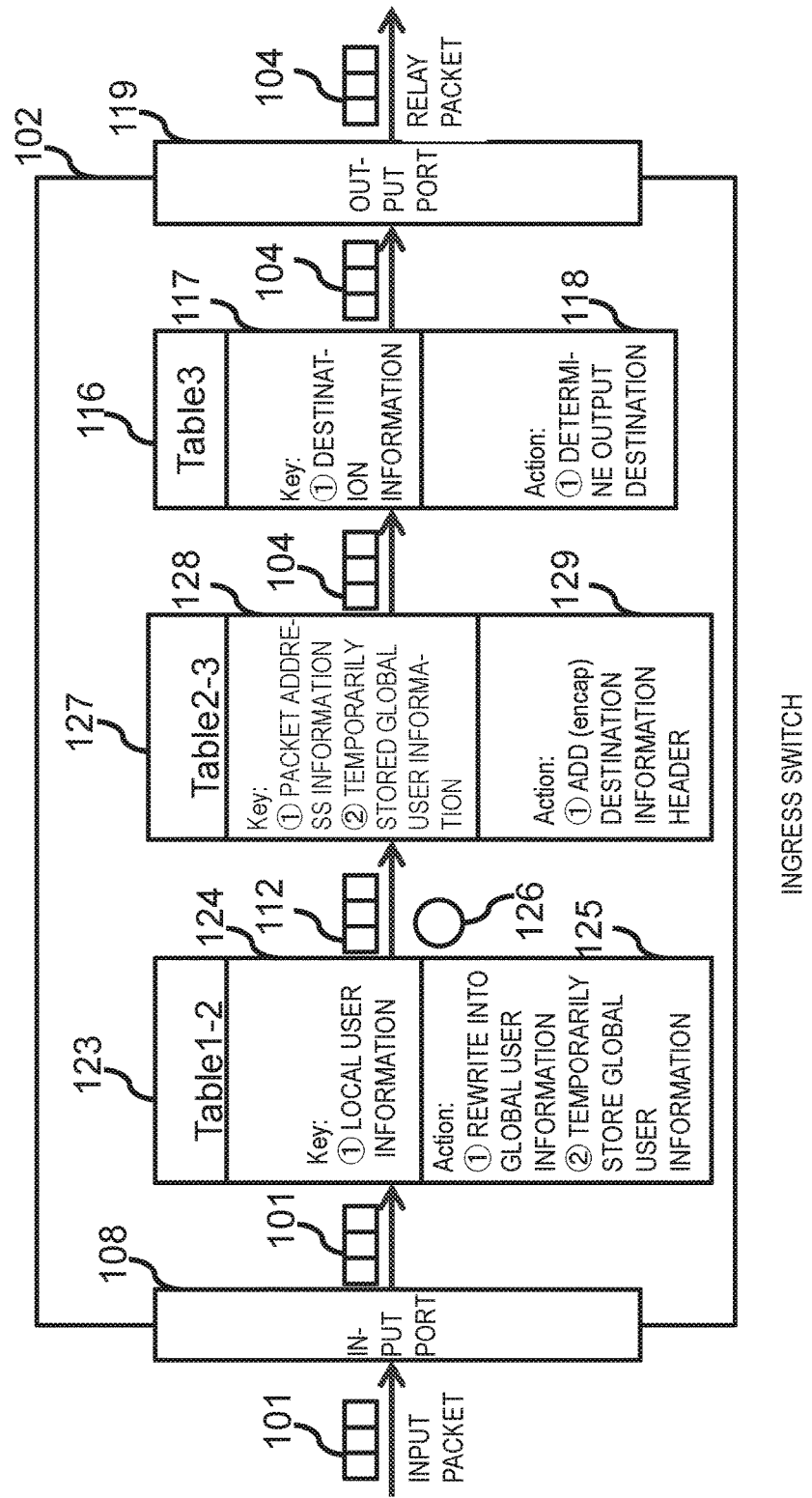
FIG. 4 is a diagram illustrating a third mode of tables in the ingress switch in the exemplary embodiment of the present invention.

An action 125 in a table 1-2 (123) in FIG. 4 includes an operation of:
(1) rewriting local user information into global user information, and
(2) temporarily storing the global user information as temporal information 126. With this arrangement, in a table 2-3 (127) in a subsequent stage, the global user information temporarily stored in a preceding stage is taken over using temporary information 126.

<First Mode of Ingress Switch 102>

FIG. 2 schematically illustrates a configuration of a first mode of the ingress switch 102. Referring to FIG. 2, the ingress switch 102 respectively includes the input port 108 an output port 119 as an input interface for the input packet 101 and as an output interface for the relay packet 104 that is an output packet. The ingress switch 102 includes in an inside thereof:
- a table 1-1 (109) for performing mapping (Mapping) of local user information of the input packet 101 to global user information;
- a table 2-1 (113) for encapsulating (encap) the packet using address information and the global user information of a packet 112, and;
- a table 3 (116) for determining an output destination of the packet 104 by destination information of the encapsulated (encap) packet 104. Encapsulation (encap) of a packet means newly adding a header of a different layer with an entirety of a header and a payload of a packet set as a payload portion of the different layer, and enclosing an original packet into a packet structure of the different layer.

A search key (Key) 110 of an entry in the table 1-1 (109) is (1) the local user information. An action (Action) 111 corresponding to the search key (Key) 110 (action that corresponds to the entry associated with the search key (Key) 110 and defines an operation to be executed at the ingress switch 102 when header information of the packet matches the search key (Key) 110) is an operation of:
(1) rewriting local user information into global user information.

A search key 114 of an entry in the table 2-1 (113) includes:
(1) packet address information; and
(2) global user information. An action 115 corresponding to the search key 114 is an operation of:
(1) adding (encap) a destination information header.

A search key 117 of an entry in the table 3 (116) is:
(1) destination information (destination information added by the operation of the action 115 in the table 2-1 (113).

An action 118 corresponding to the search key 117 is an operation of:
(1) determining an output destination.

A packet 112 is a packet obtained by conversion of the input packet 101 according to the table 1-1 (109).

A relay packet 104 is a packet encapsulated (encap) according to the table 2-1 (113).

<Second Mode of Ingress Switch 102>

FIG. 3 is a diagram illustrating a configuration of a second mode of the ingress switch 102 in FIG. 1. Referring to FIG. 3, being different from the table 2-1 (113) in FIG. 2, an action in a table 2-2 (120) is an operation of:
(1) adding (encap) destination information header; and
(2) determining an output destination of a packet. For this reason, the table 3 (116) in FIG. 2 is deleted (unneeded) in FIG. 3. That is, according to the table 2-2 (120) in the second mode, the action in the table 2-1 (113) and the table 3 (116) in the first mode are executed together.

A search key 121 of an entry in the table 2-2 (120) includes:
(1) packet address information; and
(2) global user information.

An action 122 corresponding to the search key 121 is an operation of:
(1) adding (encap) a destination information header; and (also)
(2) determining a output destination.

<Third Mode of Ingress Switch 102>

FIG. 4 is a diagram illustrating a configuration of a third mode of the ingress switch 102 in FIG. 1. Referring to FIG. 4, according to the usage of the table for encapsulation (encap), a search key of the table for encapsulation (encap) of the packet 112 including global user information does not need to be global user information itself as in the table 2-1 (113) in FIG. 2. Search can also be performed by using the global user information temporarily stored in a different form as the search key, for example.

In the table 1-2 (123) in the third mode in FIG. 4, according to an action 125, the following action is performed:
(1) when local user information is rewritten into global user information,
(2) the global user information needs to be temporarily stored in a form of temporary information 126.

The action 125 in the table 1-2 (123) in FIG. 4 is an operation of:

(1) rewriting an input packet 101 into a packet 112 including global user information; and (also)
(2) temporarily storing the global user information in a form of temporary information 126 and transmitting the information 126 to the table 2-3 (127).

A search key 124 of an entry in the table 1-2 (123) is:
(1) local user information.

The action 125 corresponding to the search key 124 is an operation of:
(1) rewriting local user information into global user information; and
(2) temporarily storing the global user information.

A search key 128 of an entry in the table 2-3 (127) includes:
(1) packet address information; and
(2) global user information that has been temporarily stored.

An action 129 corresponding to the search key 128 is an operation of:
(1) adding (encap) a destination information header.

Figure 5:
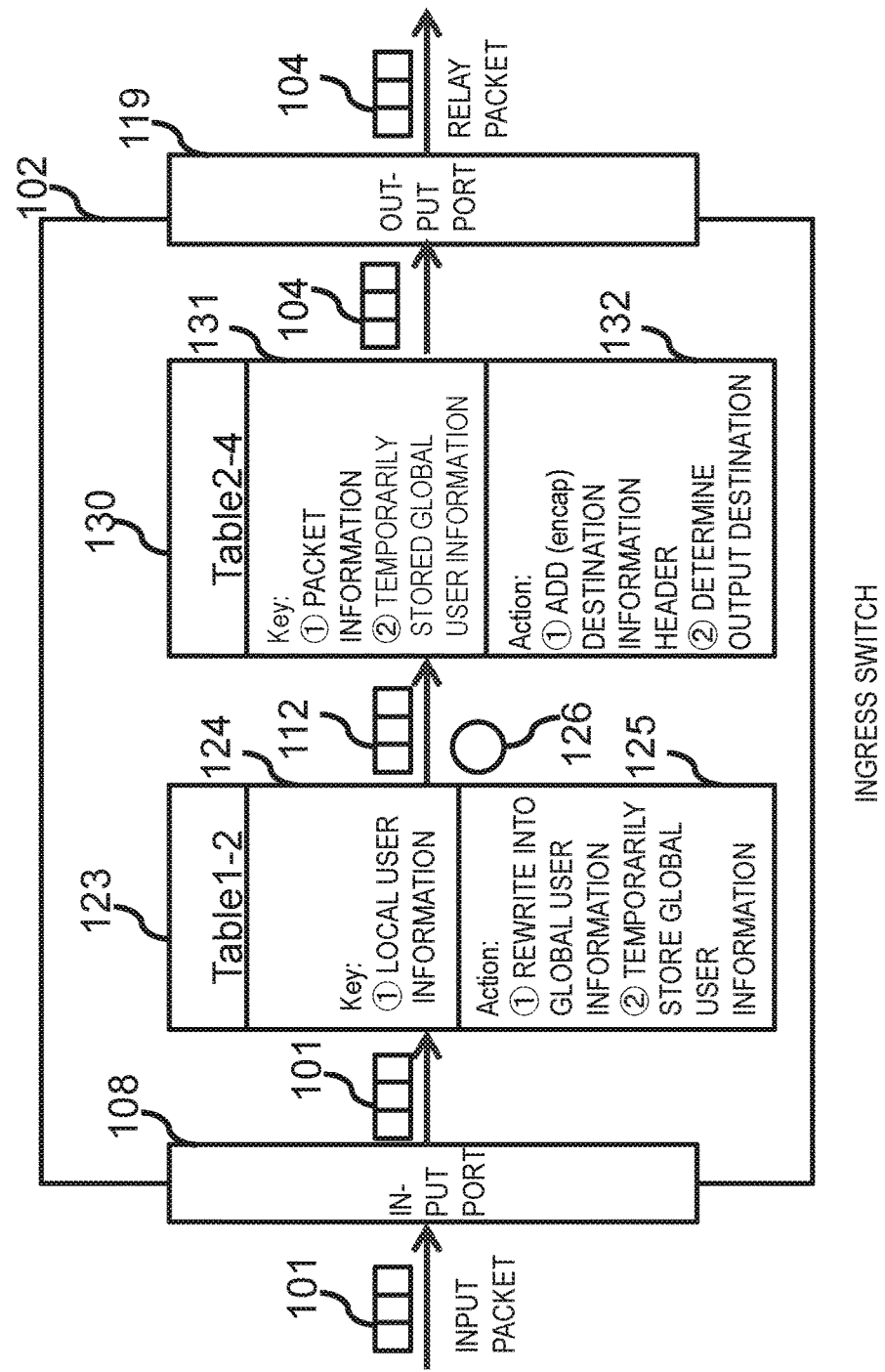
FIG. 5 is a diagram illustrating a fourth mode of tables in the ingress switch in the exemplary embodiment of the present invention.

<Fourth Mode of Ingress Switch 102>
FIG. 5 is a diagram illustrating a configuration of a fourth mode of the ingress switch 102 in FIG. 1. Referring to FIG. 5, a difference from the above-mentioned FIG. 4 is that, in the fourth mode, an action 132 in a table 2-4 (130) is an operation of:
(1) adding a destination information header; and
(2) determining a packet output destination.

In the configuration in FIG. 5, the table 3 (116) in FIG. 4 in the third mode is deleted (unneeded).

In FIG. 3, the search key for the entry of the table 2-2 (120) includes:
(1) packet address information; and
(2) global user information.

A search key 131 for the table 2-4 (130) in FIG. 5 includes:
(1) packet address information; and
(2) global user information that has been temporarily stored.

Referring to FIG. 5, according to the action 125 in the table 1-2 (123):
(1) an input packet 101 is rewritten into a packet 112 including global user information; and
(2) the global user information is stored in a form of a temporary information 126, and is forwarded to the table 2-4 (130).

A search key 124 of the entry of the table 1-2 (123) is:
(1) local user information.

An action 125 corresponding to the search key 124 is an operation of:
(1) rewriting local user information into global user information; and
(2) temporarily storing the global user information.

A search key 131 of an entry in the table 2-4 (130) includes:
(1) packet address information; and
(2) global user information that has been temporarily stored.

An action 132 corresponding to the search key 131 is an operation of:
(1) adding (encap) a destination information header; and (also)
(2) determining an output destination.

<Table Structure of Ingress Switch>
FIG. 6 is the one in which keys and actions of the respective tables (tables 1-1 and 1-2, tables 2-1 to 2-4, and table 3) in the above-mentioned first to fourth modes are summarized with respect to the table structure of the ingress switch 102 in FIG. 1.

Figure 7:
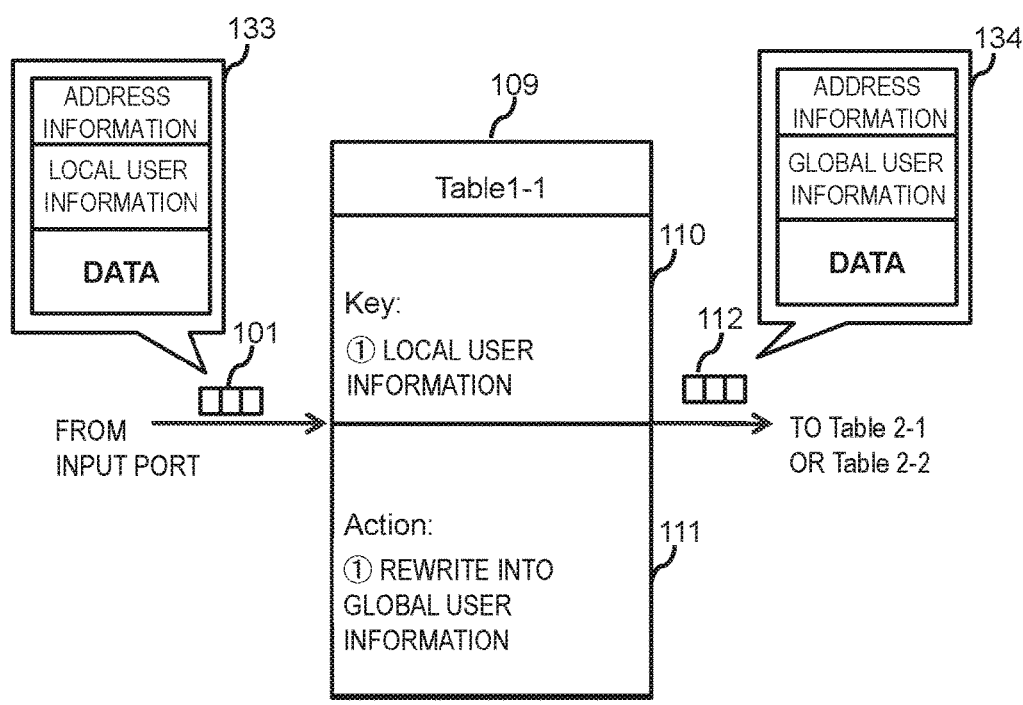
FIG. 7 is a diagram schematically illustrating details of a table 1-1 in the first mode in FIG. 2.

<Example of Table 1-1 in First Mode in FIG. 2>
FIG. 7 is a diagram illustrating the table 1-1 (109) in the first mode in FIG. 2. Referring to FIG. 7, as indicated by a reference sign 133, the input packet 101 includes:
 address information;
 local user information; and
 data (DATA). As indicated by a reference sign 134, an output packet 112 of the table 1-1 (109) includes:
 address information;
 global user information; and
 data (DATA).
A search key 110 of an entry of the table 1-1 (109) is:
(1) local user information.
The corresponding action 111 is an operation of:
(1) rewriting local user information into global user information.

When the local user information of the input packet 101 is used as the search key to search the table 1-1 (109) and matches the local user information in the table 1-1 (109) at the ingress switch 102, the local user information of the input packet 101 is rewritten into the global user information according to the action 111, and a resulting packet is output as the packet 112.

Figure 8:
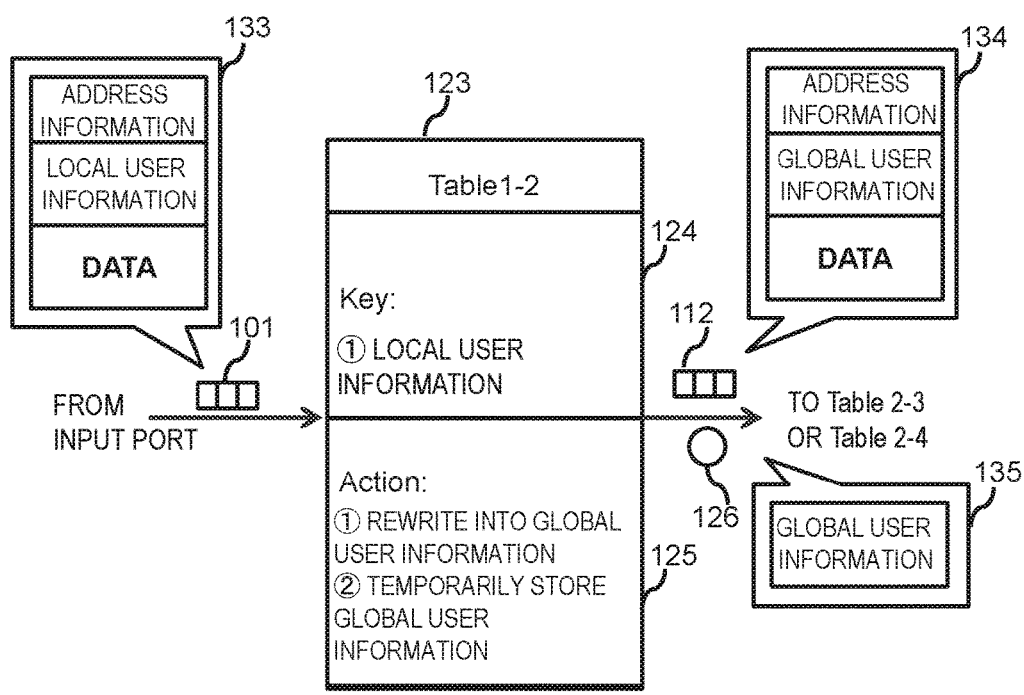
FIG. 8 is a diagram schematically illustrating a detailed example of a table 1-2 in the third mode in FIG. 4.

<Example of Table 1-2 in Third Mode in FIG. 4>
FIG. 8 is a diagram schematically describing a detailed example of the table 1-2 (123) in the third mode in FIG. 4. Referring to FIG. 8, the action 125 in the table 1-2 (123) is an operation of:
(1) rewriting local user information into global user information; and
(2) temporarily storing the global user information.

Reference sign 126 in FIG. 8 indicates information (temporary information) temporarily stored in a storage unit or the like not illustrated. The temporary information 126 temporarily stored becomes global user information 135 obtained by conversion of the local user information according to the action 125.

Figure 9:
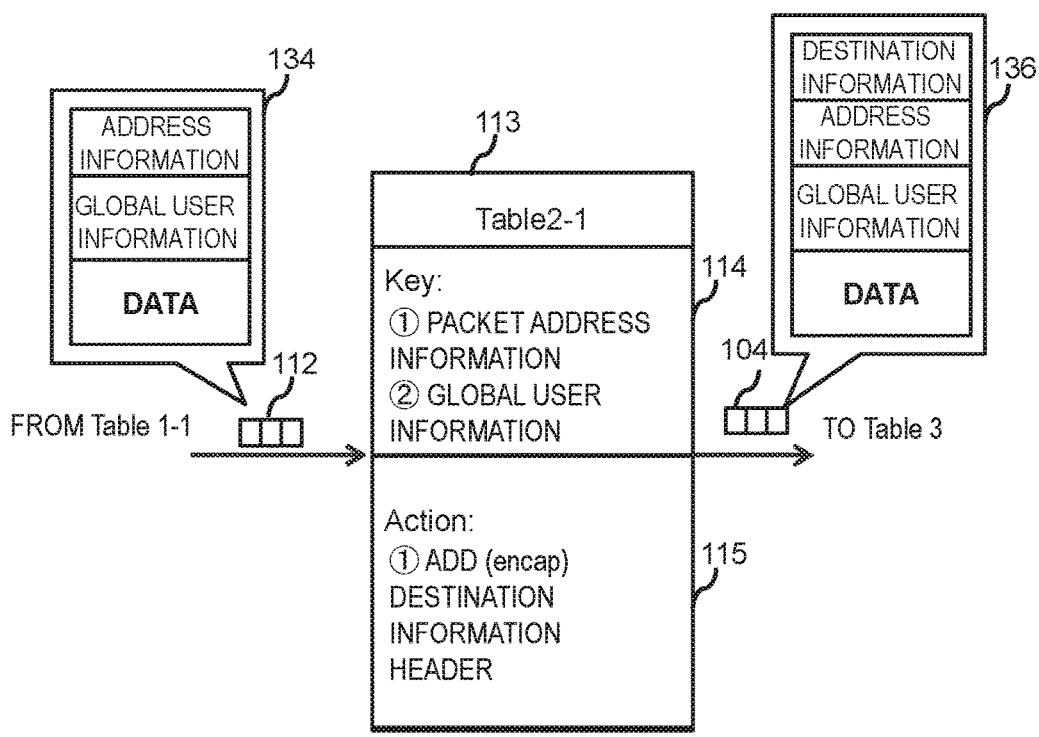
FIG. 9 is a diagram schematically illustrating a detailed example of a table 2-1 in the first mode in FIG. 2.

<Example of Table 2-1 in First Mode in FIG. 2>
FIG. 9 is a diagram schematically illustrating a detailed example of the table 2-1 (113) of the ingress switch 102 in the first mode in FIG. 2. The destination information header is added (encap) to the packet 112 received from the table 1-1 (109) in FIGS. 2 and 7 according to the action 115 in the table 2-1 (113) and a resulting packet becomes the relay packet 104. As illustrated by a reference sign 136, the relay packet 104 includes:
 destination information (header):
 address information
 global user information; and
 data (DATA). An output destination of the table 2-1 (113) is the table 3 (116).

Figure 10:
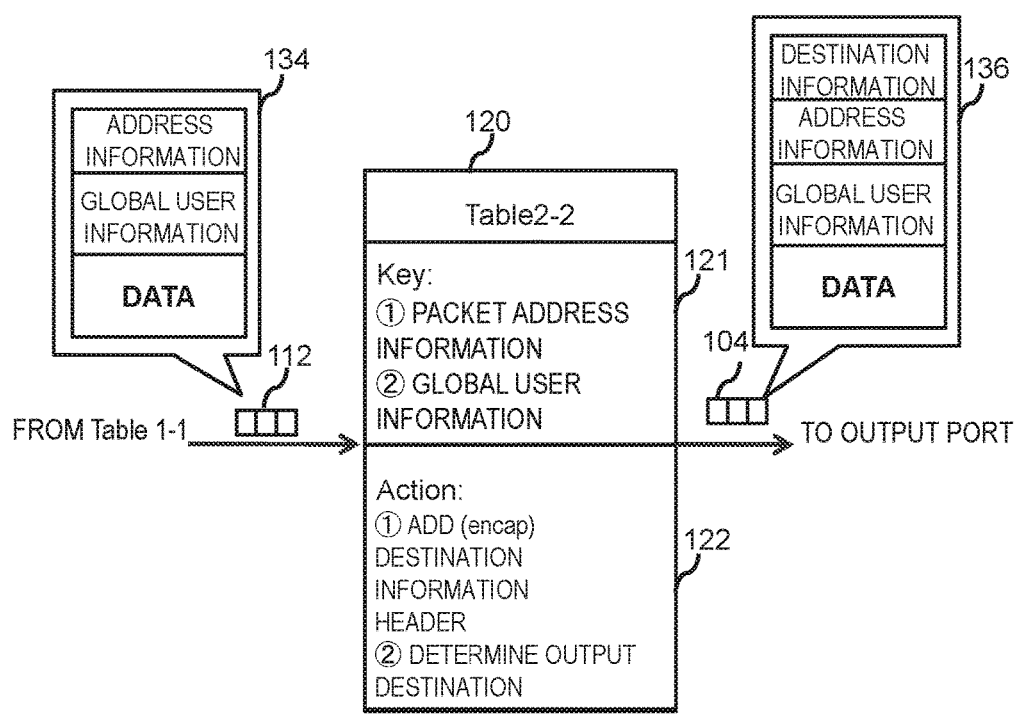
FIG. 10 is a diagram schematically illustrating a detailed example of a table 2-2 in the second mode in FIG. 3.

<Example of Table 2-2 in Second Mode in FIG. 3>
FIG. 10 is a diagram schematically illustrating a detailed example of the table 2-2 (120) of the ingress switch 102 in the second mode in FIG. 3. Referring to FIG. 10, an action 122 in the table 2-2 (120) is an operation of:
(1) adding (encap) a destination information header to a packet 112 received; and
(2) determining an output destination. For this reason, in the second mode, the table 3 in FIG. 2 is eliminated. The output destination of the table 2-2 (120) is an output port 119 in FIG. 3.

Figure 11:
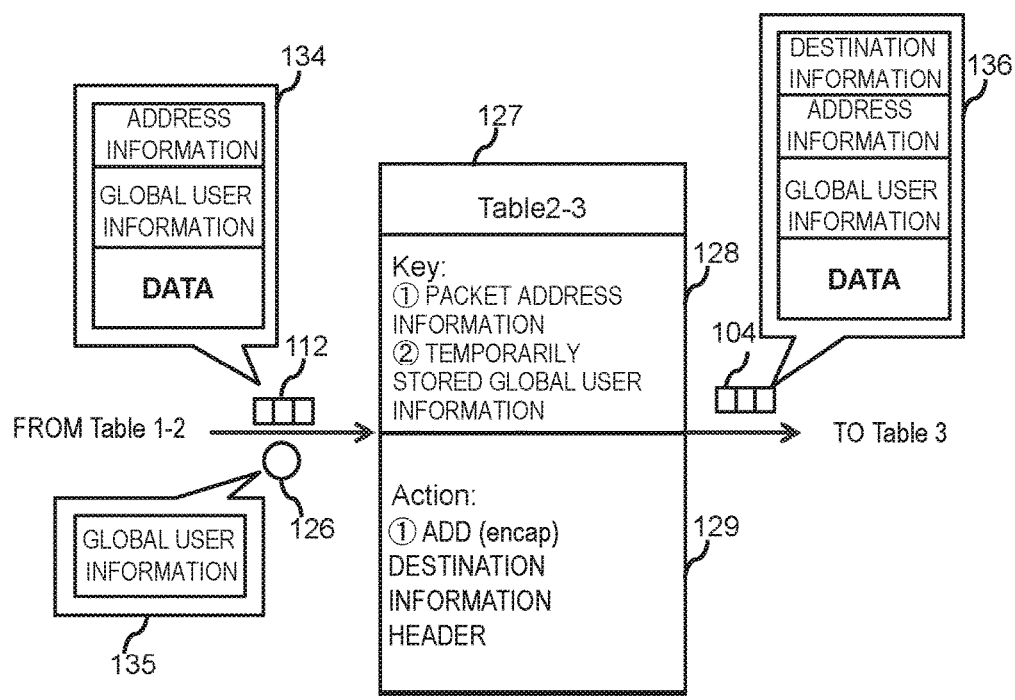
FIG. 11 is a diagram schematically illustrating a detailed example of a table 2-3 in the third mode in FIG. 4.

<Example of Table 2-3 in Third Mode in FIG. 4>
FIG. 11 is a diagram schematically illustrating a detailed example of the table 2-3 (127) of the ingress switch 102 in the third mode in FIG. 4. Referring to FIG. 11, the table 2-3 (127) receives, from the table 1-2 (123) in FIG. 8, a packet 112 including address information;
global user information; and
data (DATA),
and temporary information 126 including global user information.

A search key 128 of an entry in the table 2-3 (127) includes:
(1) packet address information; and
(2) global user information that has been temporarily stored.

A corresponding action 129 is an operation of:
(1) adding (encap) a destination information header.

As indicated by the reference sign 136, the relay packet 104 includes:
destination information (header);
address information;
global user information; and
data (DATA).

An output destination of the table 2-3 (127) is the table 3 (116).

<Example of Table 2-4 in Fourth Mode in FIG. 5>

Figure 12:
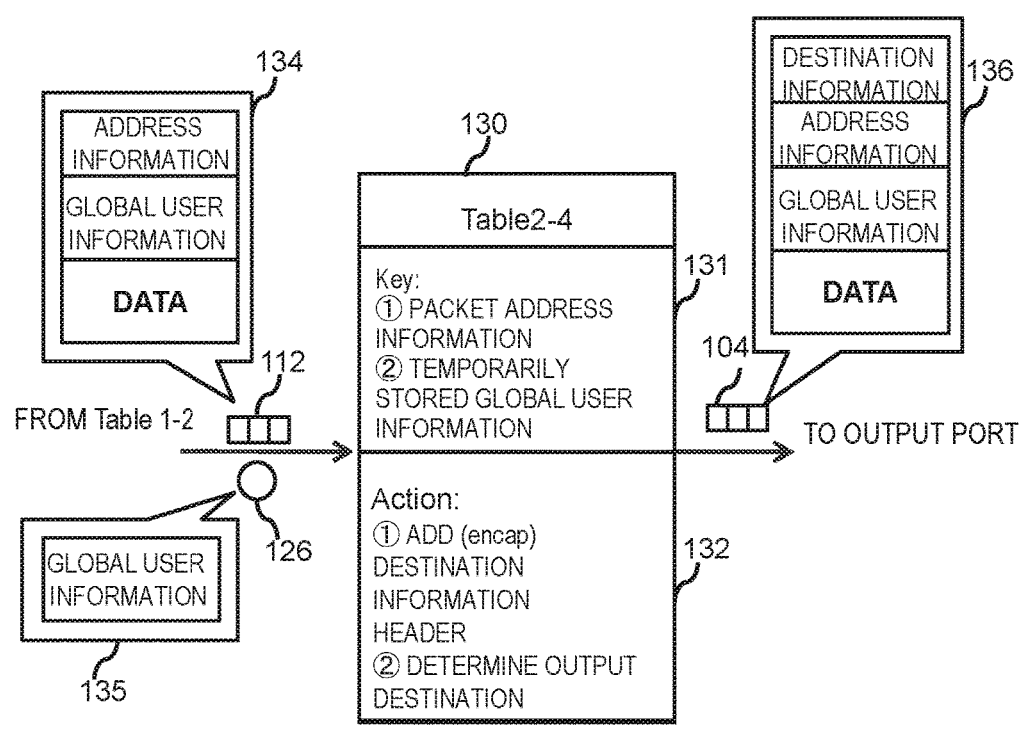
FIG. 12 is a diagram schematically illustrating a detailed example of a table 2-4 in the fourth mode in FIG. 5.

FIG. 12 is a diagram schematically illustrating a detailed example of the table 2-4 (130) in the ingress switch 102 in the fourth mode in FIG. 5. Referring to FIG. 12, the input packet 112, the output packet 104, and the temporary information 126 for the table 2-4 (130) are the same as those in FIG. 11.

An action 132 in the table 2-4 (130) is an operation of:
(1) adding (encap) a destination information header; and
(2) determining an output destination.

For this reason, the table 3 (116 in FIG. 4), which is the output destination of the table 2-3 (127) in FIG. 11, is eliminated. An output destination of the table 2-4 (130) becomes an output port 119 (in FIG. 5).

<Example of Table 3 in Third Mode in FIG. 4>

Figure 13:
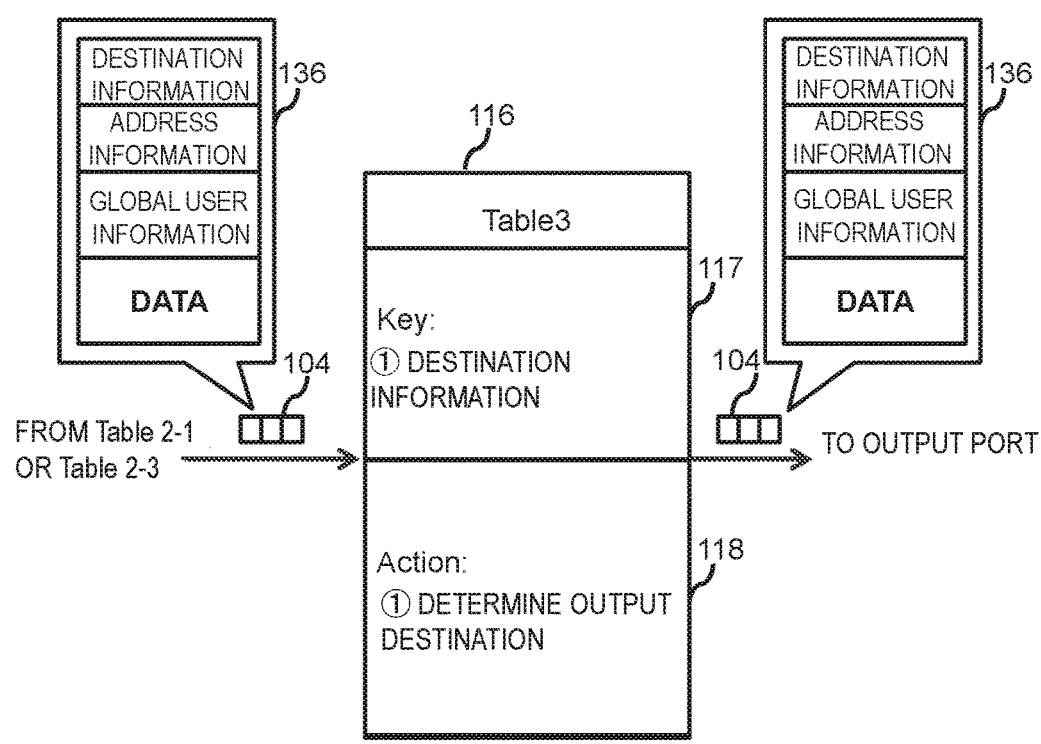
FIG. 13 is a diagram schematically illustrating a detailed example of a table 3 in the third mode in FIG. 4.

FIG. 13 is a diagram schematically illustrating a detailed example of the table 3 (116) of the ingress switch 102 in the third mode in FIG. 4. In the table 3 (116), an input packet and an output packet are each the relay packet 104. In the table 3 (116), a search key 117 is destination information in a content (indicated by the reference sign 136) of the relay packet 104, and an action 118 is an operation of determining an output destination of a packet. The output destination becomes an output port 119.

<Configuration Example of Egress Switch 106 in FIG. 1>

Figure 14:
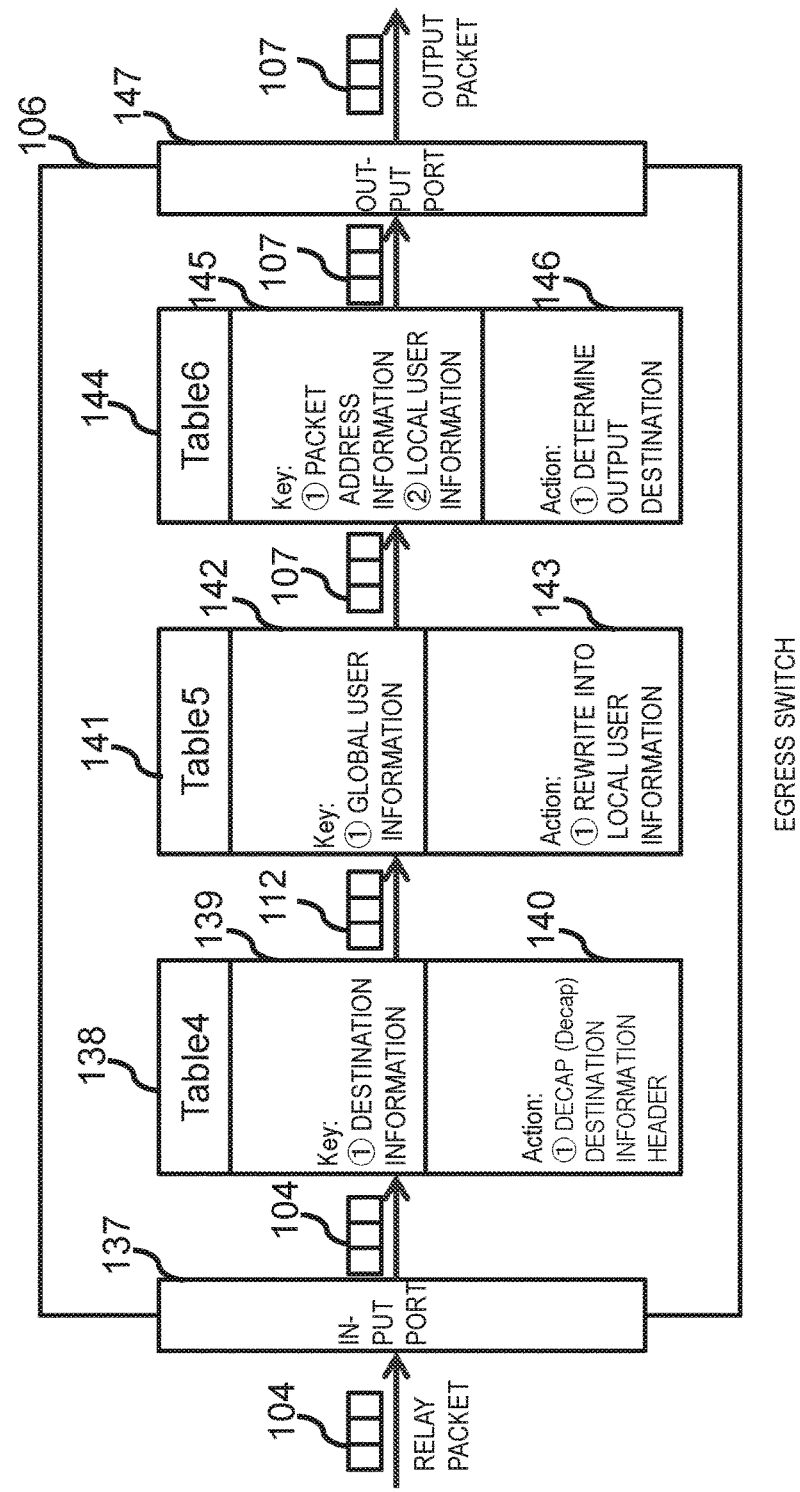
FIG. 14 is a diagram schematically illustrating a table configuration of an egress switch in the exemplary embodiment of the present invention.

FIG. 14 is a diagram illustrating a configuration of the egress switch 106 in FIG. 1. Referring to FIG. 14, the egress switch 106 respectively includes an input port 137 and an output port 14 as an input interface for the relay packet 104 and an output interface. The egress switch 106 includes in its inside (between an input port 137 and an output port 147):
  a table 4 (138) for decapsulating (decap) a destination information header according to destination information;
  a table 5 (141) for performing mapping (Mapping) of global user information to & local user information; and
  a table 6 (144) for determining a packet output destination by packet address information and local user information.

A search key 139 of an entry in the table 4 (138) is
(1) destination information.

An action 140 corresponding to the search key 139 is an operation of:
(1) decapsulating (decap) a destination information header.

A search key 142 of an entry in the table 5 (141) is:
(1) global user information.

An action 143 corresponding to the search key 142 is an operation of:
(1) rewriting global user information into local user information.

A search key 145 for the table 6 (144) includes:
(1) packet address information; and
(2) local user information.

An action 146 corresponding to the search key 145 is an operation of:
(1) determining an output destination.

A packet 112 is a packet in which the destination information header has been decapsulated (decap) from a relay packet 104 according to the action 140 in the table 4 (138).

An output packet 107 is a packet in which the global user information of the packet 112 has been rewritten into local user information according to the table 5 (141).

<Example of Table 4 of Egress Switch 106 in FIG. 14>

Figure 15:
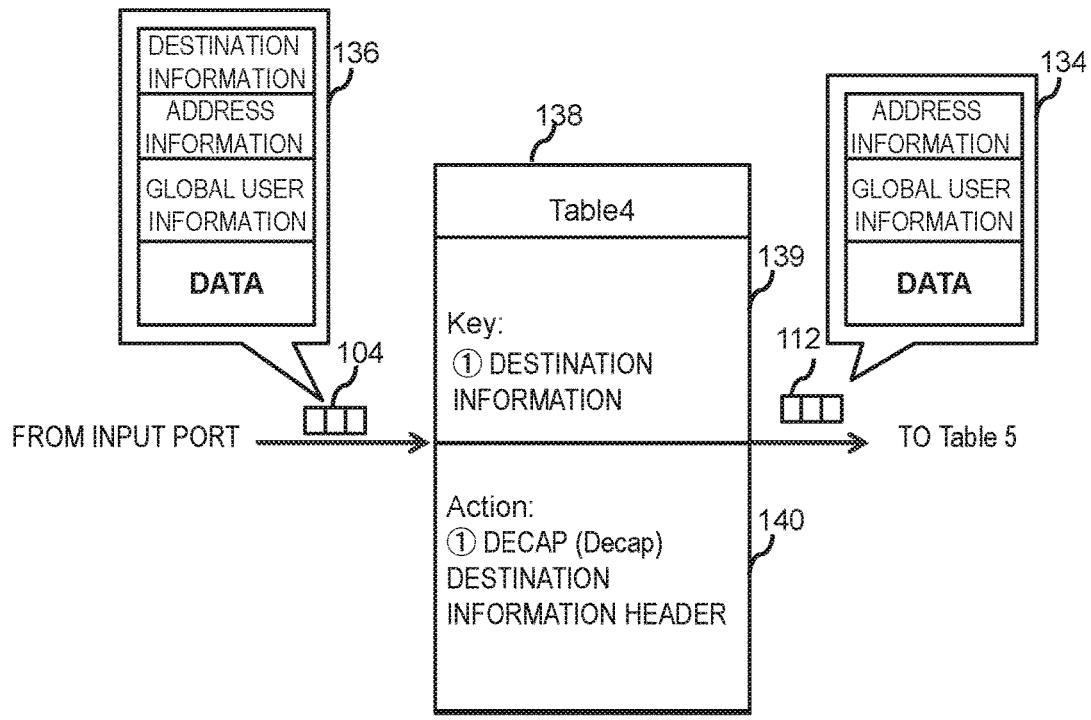
FIG. 15 is a diagram schematically illustrating a detailed example of a table 4 in FIG. 14.

FIG. 15 is a diagram schematically illustrating a detailed example of the table 4 (138) of the egress switch 106 in FIG. 14. Referring to FIG. 15, as illustrated by a reference sign 136, a content of the relay packet 104 includes:
destination information
address information;
global user information; and
data (DATA). As illustrated by a reference sign 134, a content of the packet 112 includes:
address information;
global user information; and
data (DATA).

The search key 139 of an entry in the table 4 (138) is:
(1) the destination information.

A corresponding action 140 is an operation of:
(1) decapsulating (decap) the destination information header.

An output destination of the table 4 (138) is the table 5 (141).

<Example of Table 5 of Egress Switch 106 in FIG. 14>

Figure 16:
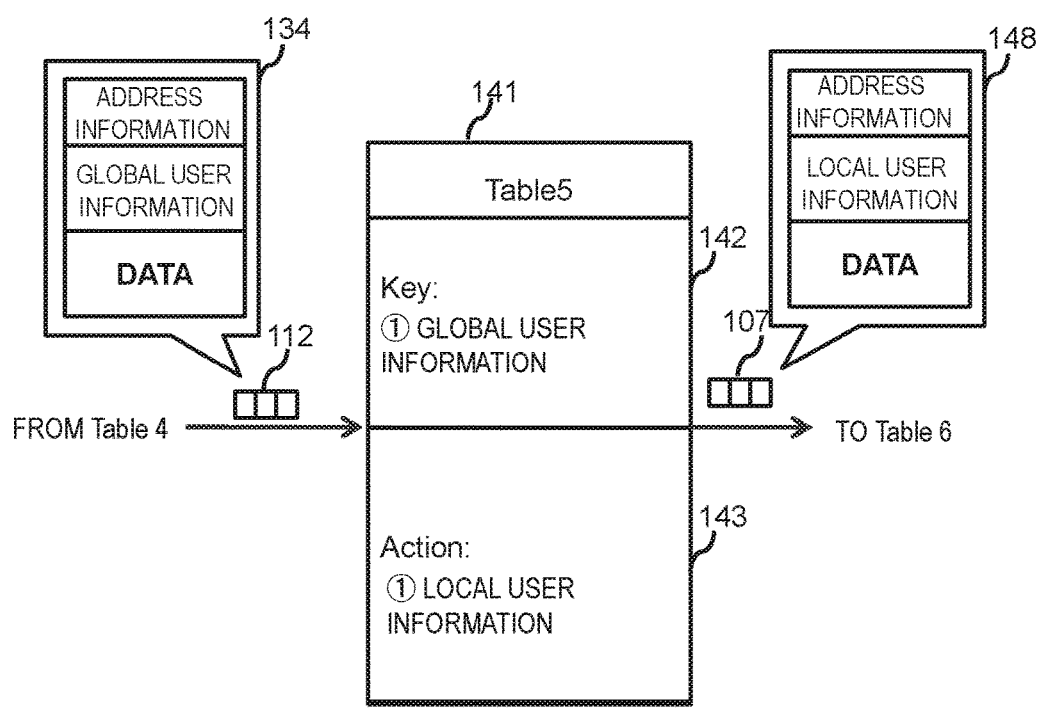
FIG. 16 is a diagram schematically illustrating a detailed example of a table 5 in FIG. 14.

FIG. 16 is a diagram schematically illustrating the table 5 (141) of the egress switch 106 in FIG. 14. As indicated by the reference sign 134, a content of the packet 112 includes:
address information;
global user information; and
data (DATA). As indicated by a reference sign 148, a content of the output packet 107 includes:
address information;
local user information; and
data (DATA).

A search key 142 of an entry in the table 5 (141) is:
(1) global user information.

An action 143 is an operation of:
(1) mapping (Mapping) global user information to local user information.

An output destination of the table 5 (141) is the table 6 (144).

<Example of Table 6 of Egress Switch 106 in FIG. 14>

Figure 17:
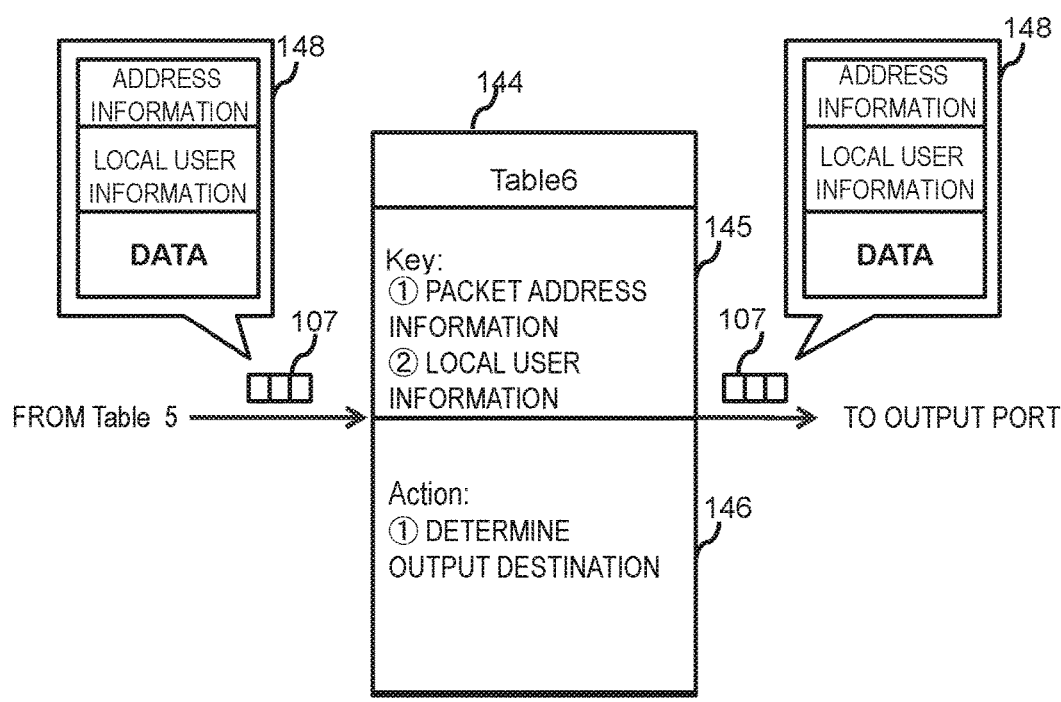
FIG. 17 is a schematically illustrating a detailed example of a table 6 in FIG. 14.

FIG. 17 is a diagram schematically illustrating a detailed example of the egress switch 106 in FIG. 14. As indicated by the reference sign 148, a content of an input/output packet 107 includes:
address information;
local user information; and
data (DATA).

A search key 145 of an entry in the table 6 (144) includes:
(1) packet address information; and
(2) local user information.

A corresponding action 146 is an operation of:
(1) determining an output destination.

The output destination of the table 6 (144) is an output port.

The following describes operations of the exemplary embodiment, the table configuration of which has been described above. A description will be given about a flow in which a packet is processed in the network. Switches located at edges of the network 103 are the ingress switch 102 and the egress switch 106, and the switches located in the core of the network are the relay switches 105.

<Ingress Switch 102>

The ingress switch 102 converts an input packet 101 including original information to a relay packet 104 including the following information:
  egress information of a network;
  global user information of the packet; and
  original information of the packet. The ingress switch 102 then outputs the relay packet 104 to the relay switch 105.

<Relay Switch 105>

The relay switch 105 retrieves egress information of a network of the relay packet 104 to forward the relay packet 104 to the egress switch 106.

<Egress Switch 106>

When the relay packet 104 arrives at the egress switch 106, the egress switch 106 checks whether or not the packet is addressed to the egress switch 106 itself. When the packet is addressed to the egress switch itself, the egress switch first removes egress information of a network, that is, a destination information header. Then, global user information is rewritten into local user information of the egress switch 106. Finally, the egress switch 106 determines an output destination to output the relay packet 104. As described above, the ingress switch 102 is classified into the four modes according to the usage mode of tables of the switch.

<Operations of Ingress Switch 102 in First Mode>

Operations of the ingress switch 102 in the first mode in FIG. 2 will be described. Referring to FIG. 2, in the ingress switch 102, the input packet 101 arrives at the table 1-1 (109) through the input port 108. Using local user information of the input packet 101 as a key, the table 1-1 (109) is searched. When the search key 110 of an entry in the table 1-1 (109) is hit (Hit), the action 111 of this entry is executed. That is, by performing an operation of rewriting local user information into global user information according to the action 111, the input packet 101 is rewritten into a packet 112. The packet 112 obtained by rewriting is forwarded to the table 2-1 (113).

The table 2-1 (113) is searched, using the following information of a header of the packet 112, as a key:
  address information; and
  global user information.

When the search key 114 of an entry in the table 2-1 (113) is hit (Hit), the action 115 of this entry is executed. That is, a destination information header of the packet is added (encap) to the packet 112, according to the action 115.

The packet to which the destination information header has been added becomes a relay packet 104. The relay packet 104 is forwarded to the table 3 (116).

The table 3 (116) is searched, using destination information of the relay packet 104 as a key. When the search key 117 of an entry in the table 3 (116) is hit (Hit), the action 118 of this entry is executed to determine an output destination. The relay packet 104 is output from the output port 119.

<Operations of Ingress Switch 102 in Second Mode>

Next, operations of the ingress switch 102 in the second mode in FIG. 3 will be described. Referring to FIG. 3, in the ingress switch 102, the input packet 101 is forwarded to the table 1-1 (109) through the input port 108. The table 1-1 (109) is searched, using local user information of the input packet 101 as a key. When the search key 110 of an entry in the table 1-1 (109) is hit (Hit), the action 111 of this entry is executed. That is, by rewriting the local user information to global user information according to the action 111, the input packet 101 is rewritten into a packet 112. The packet 112 obtained by the rewriting is forwarded to the table 2-2 (120).

The table 2-2 (120) is searched, using the following information of a header of the packet 112 as a key:
  address information; and
  global user information. When the key 121 of an entry in the table 2-2 (129) is hit (Hit), the action 122 of this entry is executed. That is, a destination information header of the packet is added to the packet 112 according to the action 122. Further, an output destination is determined. The packet to which the destination information header has been added becomes a relay packet 104.

The relay packet 104 is output from the output port 119.

<Operations of Ingress Switch 102 in Third Mode>

Next, operations of the ingress switch 102 in the third mode in FIG. 4 will be described. Referring to FIG. 4, in the ingress switch 102, the input packet 101 is forwarded to the table 1-2 (123) through the input port 108. The table 1-2 (123) is searched, using the local user information of the input packet 101 as a key. When the search key 124 of an entry in the table 1-2 (123) is hit (Hit), the action 125 of this entry is executed. That is, by rewriting local user information to global user information according to the action 125, the input packet 101 is rewritten into the packet 112. Further, the global user information is temporarily stored as the temporary information 126. The packet 112 obtained by the rewriting and the temporary information 126 are forwarded to the table 2-3 (127).

The table 2-3 (127) is searched, using the following information of the header of the packet 112, as a key:
  address information; and
  global user information temporarily stored as the temporary information 126. When the key 128 of an entry in the table 2-3 (127) is hit (Hit), the action 129 of this entry is executed. That is, a destination information header of the packet is added to the packet 112 according to the action 129. The packet to which the destination information header has been added becomes a relay packet 104. The relay packet 104 is forwarded to the table 3 (116).

The table 3 (116) is searched, using destination information of the relay packet 104 as a key. When the key 117 of an entry in the table 3 (116) is hit (Hit), the action 118 of this entry is executed. That is, an output destination is determined, according to the action 118. The relay packet 104 is output from the output port 119.

<Operations of Ingress Switch 102 in Fourth Mode>

Subsequently, operations of the ingress switch 102 in the fourth mode in FIG. 5 will be described. Referring to FIG. 5, in the ingress switch 102, the input packet 101 is forwarded to the table 1-2 (123) through the input port 108. The table 1-2 (123) is searched, using the local user information of the input packet 101 as a key. When the search key 124 of an entry in the table 1-2 (123) is hit (Hit), the action 125 of this entry is executed. That is, by performing operation of rewriting local user information into global user information according to the action 125, the input packet 101 is rewritten into the packet 112. The global user information is temporarily stored as the temporary information 126.

The packet 112 obtained by the rewriting and the temporary information 126 are forwarded to the table 2-4 (130). The table 2-4 (130) is searched, using the following information as a key:

address information of the packet 112; and global user information that has temporarily been stored as the temporary information 126. When the key 131 of an entry of the table 2-4 (130) is hit (Hit), the action 132 of this entry is executed. That is, a destination information header of the packet is added to the packet 112 according to the action 132. Further, an output destination is determined.

The packet to which the destination information header has been added becomes a relay packet 104.

The relay packet 104 is output from the output port 119.

<Table Configurations of Ingress Switches in First to Fourth Modes>

A summary of table configurations of the ingress switches in the first to fourth modes in FIG. 6 will be described.

According to whether the global user information is temporarily stored after the local user information has been rewritten into the global user information, the tables 1 (Tables 1-1 and 1-2) are classified into two patterns.

The table 1-1 (109) in FIG. 2 has a pattern in which the global user information is not stored as the temporary information. The table 1-2 (123) in FIG. 4 has a pattern in which the global user information is stored as the temporary information.

Tables 2 are classified into 4 patterns.

The search keys for the tables 2 are classified into two patterns, corresponding to the tables 1-1 and 1-2. The actions of the tables 2 are classified into two patterns according to whether the output destination is determined or not.

When global user information is not stored as temporary information, a search key for each table 2 becomes the global user information of the packet. The search keys for the table 2-1 (113) in FIG. 2 and the table 2-2 (120) are in accordance with this pattern.

When global user information is stored as the temporary information 126, the search key for each table 2 becomes the global user information of the temporary information stored rather than global user information of the packet. The search keys for the table 2-3 (127) in FIG. 4 and the table 2-4 (130) in FIG. 5 are in accordance with this pattern.

In the case of the table 2-1 (113) in FIG. 2 and the table 2-3 (127) in FIG. 4, the action in each table 2 is only the operation of adding the destination information header. Then, the table 3 (116) is necessary in the first mode and the third mode.

In the case of the table 2-2 (120) in FIG. 3 and the table 2-4 (130) in FIG. 5, the action includes (1) an operation of adding a destination information header to the packet; and (2) an operation of determining an output destination. Thus, the tables 3 (116) in FIG. 1 and FIG. 3 are not necessary in the second mode and the fourth mode.

<Operations Related to Table 1-1 in FIG. 7>

The operations related to the table 1-1 (109) in FIG. 7 (table 1 of the ingress switch 102 in each of the first and second modes) will be described. The content 133 of the input packet 101 in FIG. 7 includes:

address information;

local user information; and data (DATA).

The table 1-1 (109) is searched, using the local user information of the input packet 101 as a key. When the key 110 of an entry in the table 1-1 (109) is hit (Hit), the action 111 of this entry is executed. That is, by performing the operation of rewriting local user information into global user information according to the action 111, the input packet 101 is rewritten into a packet 112.

A content 134 of the packet 112 rewritten includes:

address information;

global user information; and data (DATA).

The packet 112 is forwarded to the table 2-1 (113) or the table 2-2 (120).

<Operations Related to Table 1-2 in FIG. 8>

Next, the operations related to the table 1-2 (123) in FIG. 8 (table 1 of the ingress switch 102 in each of the third mode and the fourth mode) will be described. Referring to FIG. 8, the content 133 of the input packet 101 includes:

address information;

local information; and data (DATA).

The table 1-2 (123) is searched, using the local user information of the input packet 101 as a key. When the key 124 of an entry in the table 1-2 (123) is hit (Hit), the action 125 of this entry is executed. That is, by performing an operation of rewriting local user information into global user information according to the action 125, the input packet 101 is rewritten into a packet 112. The global user information is temporarily stored in the form of the terminal information 126.

The content 134 of the packet 112 obtained by the rewriting includes:

address information;

global user information; and data (DATA).

The content 135 of the temporary information 126 includes global user information.

The packet 112 and the temporary information 126 are forwarded to the table 2-3 (127) or the table 2-4 (130).

<Operations Related to Table 2-1 in FIG. 9>

The operations related to the table 2-1 (113) in FIG. 9 (table 2 in the ingress switch 102 in the first mode) will be described. Referring to FIG. 9, as illustrated by the reference sign 134, the content of the packet 112 supplied from the table 1-1 (109) includes:

address information;

global user information; and data (DATA). The table 2-1 (113) is searched, using the following information of the packet 112 as a key:

address information; and global user information. When the key 114 of an entry in the table 2-1 (113) is hit (Hit), the action 115 of this entry is executed. That is, a destination information header of the packet is added (encap) to the packet 112, according to the action 115. The packet to which the destination information header has been added becomes a relay packet 104.

The content 136 of the relay packet 104 includes:

destination information (destination information header);

address information;

global user information; and data (DATA).

The relay packet 104 is forwarded to the table 3 (116).

<Operations Related to Table 2-2 in FIG. 10>

Next, the operations related to the table 2-2 (120) in FIG. 10 (table 2 of the ingress switch 102 in the second mode) will be described. As indicated by the reference sign 134, the content of the packet 112 supplied from the table 1-1 (109) includes:

address information;
global user information; and
data (DATA). The table 2-2 (120) is searched, using the following information of the packet 112 as a key:
(1) address information; and
(2) global user information.
When the key 121 of an entry in the table 2-2 (120) is hit (Hit), the action 122 of this entry is executed. That is, a destination information header is added (encap) to the packet 112, according to the action 122. Further, an output destination is determined.

The packet to which the destination information header has been added becomes a relay packet 104.

The content 136 of the relay packet 104 includes:
destination information;
address information;
global user information; and
data (DATA).

The relay packet 104 is output from the output port 119.

<Operations Related to Table 2-3 in FIG. 11>

Next, the operations related to the table 2-3 (127) in FIG. 11 (table 2 of the ingress switch 102 in the third mode) will be described. As illustrated by the reference sign 134, the content of the packet 112 supplied from the table 1-2 (123) includes:
address information;
global user information; and
data (DATA).

The content 135 of the temporary information 126 includes the global user information.

The table 2-3 (127) is searched, using the following information as a key:
(1) address information of the packet 112; and
(2) global user information temporarily stored as the temporary information 126.

When the key 128 of an entry in the table 2-3 (127) is hit (Hit), the action 129 of this entry is executed. In this case, a destination information header of the packet is added to the packet 112.

The packet to which the destination information header has been added becomes a relay packet 104.

The content 136 of the relay packet 104 includes:
destination information;
address information;
global user information; and
data (DATA). The relay packet 104 is forwarded to the table 3 (116).

<Operations Related to Table 2-4 in FIG. 12>

Next, the operations related to the table 2-4 (130) in FIG. 12 (table 2 of the ingress switch 102 in the fourth mode) will be described. As indicated by the reference sign 134, the content of the packet 112 supplied from the table 1-2 (123) includes:
address information;
global user information; and
data (DATA).

The content 135 of the temporary information 126 includes the global user information.

The table 2-4 (130) is searched, using the following information as a key:
(1) address information of the packet 112; and
(2) global user information temporarily stored as the temporary information 126.

When the key 131 of an entry in the table 2-4 (130) is hit (Hit), the action 132 of this entry is executed. That is, a destination information header of the packet is added to the packet 112, according to the action 132.

Further, an output destination is determined.

The packet to which the destination information header has been added becomes the relay packet 104. The content 136 of the relay packet 104 includes:
destination information;
address information;
global user information; and
data (DATA).

The relay packet 104 is output from the output port 119.

<Operations Related to Table 3 in FIG. 13>

Next, the operations related to the table 3 (116) in FIG. 13 (table 3 of the ingress switch 102 in each of the first and third modes) will be described. The content 136 of the relay packet 104 supplied from the table 2-1 (113) or the table 2-3 (127) includes:
destination information;
address information;
global user information; and
data (DATA).

The table 3 (116) is searched, using the destination information of the relay packet 104 as a key. When the key 117 of an entry in the table 3 (116) is hit (Hit), the action 118 of this entry is executed. The output destination is determined, according to the action 118. The relay packet 104 is output from the output port 119.

<Egress Switch 106 in FIG. 14>

Next, the egress switch 106 in FIG. 14 will be described. Referring to FIG. 14, in the egress switch 106, the relay packet 104 is forwarded to the table 4 (138) through the input port 137.

The table 4 (138) in the egress switch 106 is searched, using the destination information of the relay packet 104 as a key. When the key 139 of an entry in the table 4 (138) is hit (Hit), the action 140 of this entry is executed. That is, the destination information header of the relay packet 104 is decapsulated (decap) according to the action 140, and a resulting packet becomes a packet 112. The packet 112 is forwarded to the table 5.

The table 5 (141) in the egress switch 106 is searched, using the global user information of the packet 112 as a key. When the key 142 of an entry in the table 5 (141) is hit (Hit), the action 143 of this entry is executed. That is, global user information of the packet 112 is rewritten into local user information of the egress switch 106 according to the action 143.

The packet obtained by the rewriting becomes an output packet 107.

The output packet 107 is forwarded to the table 6 (144).

The table 6 (144) in the egress switch 106 is searched, using the following information of the output packet 107 as a key:
(1) address information; and
(2) local user information.

When the key 145 of an entry in the table 6 (144) is hit (Hit), the action 146 of this entry is executed. That is, an output destination is determined according to the action 146. The output packet 107 is output from the output port 147.

Local user information of an input packet may not be the same as local user information of an output packet. Local user information is different in each switch. Thus, when an ingress switch and an egress switch are the same switch, these two items of the local user information are the same. When the ingress switch and the egress switch are not the same switch, these two items of the local user information are different.

<Operations Related to Table 4 in FIG. 15>

Next, the operations related to the table 4 (138) in FIG. 15 (table 4 of the egress switch 106) will be described.

The content 136 of the relay packet 104 supplied from the input port includes:
- destination information;
- address information
- global user information; and
- data (DATA).

The table 4 (138) is searched, using the destination information of the relay packet 104 as the key. When the key 139 of an entry in the table 4 (138) is hit (Hit), the egress switch 106 executes the action 140 of this entry. The destination information header of the relay packet 104 is decapsulated according to the action 140, and a resulting packet becomes the packet 112. As indicated by the reference sign 134, the content of the packet 112 includes:
- address information;
- global user information; and
- data (DATA).

The packet 112 is forwarded to the table 5.

<Operations Related to Table 5 in FIG. 16>

The operations related to the table 5 (141) in FIG. 16 (table 5 of the egress switch 106) will be described. As indicated by the reference sign 134, the content of the packet 112 supplied from the table 4 includes:
- address information;
- global user information; and
- data (DATA). The table 5 (141) is searched, using global user information of the packet 112 as a key. When the key 142 of an entry in the table 5 (141) is hit (Hit), the action 143 of this entry is executed. That is, by rewriting global user information into local user information of the egress switch 106 according to the action 143, the packet 112 is rewritten into an output packet 107. The content 148 of the output packet 107 obtained by the rewriting includes:
- address information;
- local user information; and
- data (DATA).

The output packet 107 is forwarded to the table 6.

<Operations Related to Table 6 in FIG. 17>

The operations related to the table 6 (144) in FIG. 17 (table 6 in the egress switch 106) will be described. As indicated by the reference sign 148, the content of the output packet 107 supplied from the table 5 (41) includes:
- address information;
- local user information; and
- data (DATA).

The table 6 (144) is searched, using the following information of the output packet 107 as a key:
(1) address information; and
(2) local user information.

When the key 145 of an entry in the table 6 (144) is hit (Hit), the action 146 of this entry is executed. An output destination of the output packet 107 is determined, according to the action 146.

The output packet 107 is output from the output port 147.

In any one of the above-mentioned first to fourth modes, when an action at the ingress/egress of the network is implemented as an action resulted from searches of the tables, the number of necessary action patterns can be reduced, and accommodation of the actions resources can be expanded.

Second Exemplary Embodiment

Figure 18:
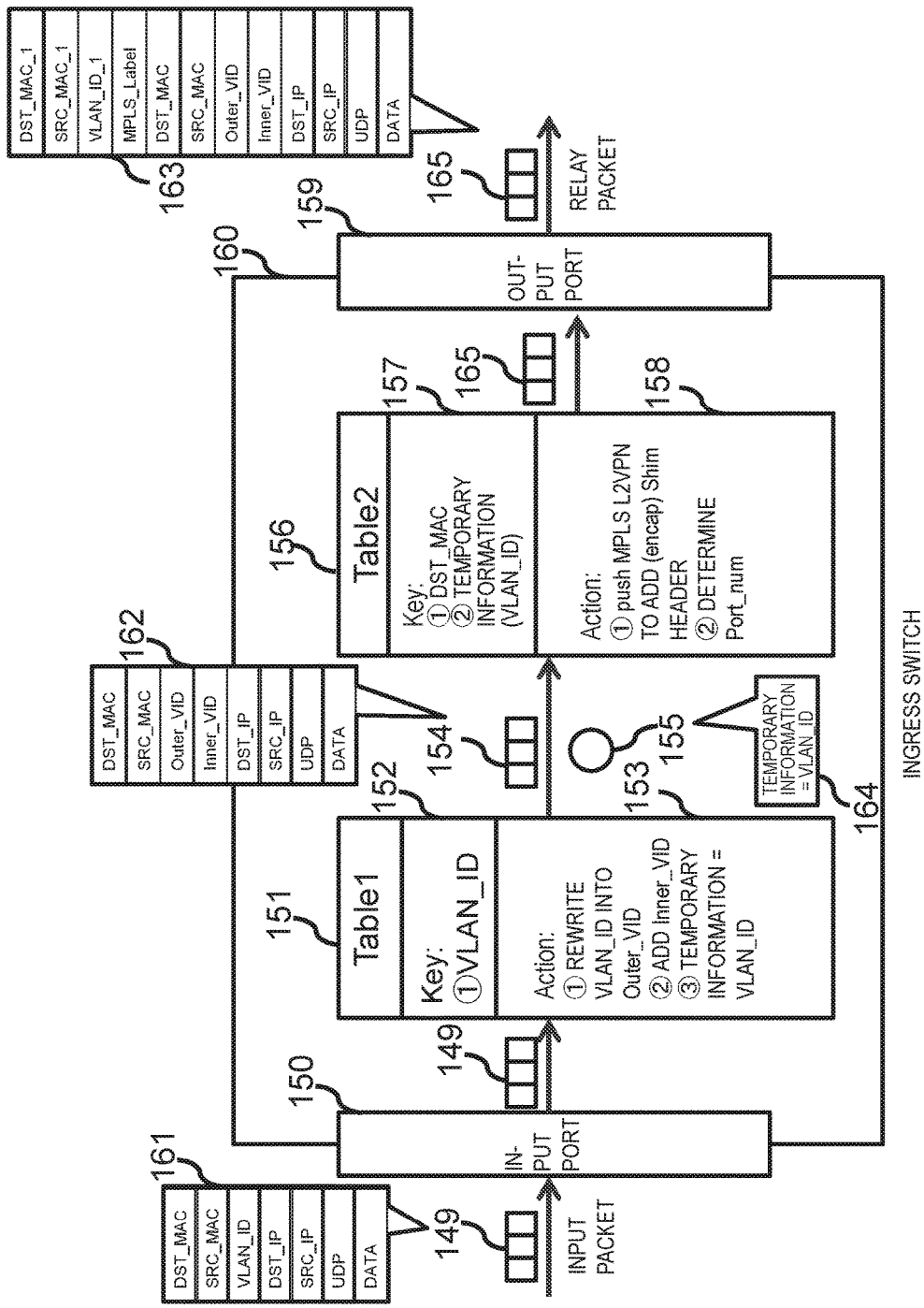
FIG. 18 is a diagram illustrating a table configuration of an ingress switch in an exemplary embodiment of the present invention.

A second exemplary embodiment of the present invention will be described. FIG. 18 is a diagram illustrating a configuration of an ingress switch in the second exemplary embodiment of the present invention. Referring to FIG. 18, an ingress switch 160 includes an input port 150 and an output port 159 as input and output interfaces for an input packet 149. A content of the input packet 149 is indicated by a reference sign 161 (the input packet 149 includes DST_MAC, SRC_MAC, VLAN_ID, DST_IP, SRC_IP, UDP, and DATA). A packet 154 is a QinQ packet including Outer VID (Outer_VLAN_ID) and Inner_VID (Inner_VLAN_ID). QinQ is a scheme for identifying a user by giving another VLAN tag in a network of a communication carrier. A contents of the packet 154 is indicated by a reference sign 162 (the packet 154 includes DST_MAC, SRC_MAC, Outer_VID, Inner_VID, VAN_ID, DST_IP, SRC_IP, UDP, and DATA). A relay packet 165 is a QinQ packet to which an MPLS (Multi Protocol Label Switching) header has been added. The content of the relay packet 165 is indicated by a reference sign 163 (the relay packet 165 includes DST_MAC_1, SRC_MAC_1, VLAN_ID_1, MPLS_Label, DST_MAC, SRC_MAC, Outer_VID, Inner_VID, DST_IP, SRC_IP, UDP, and DATA). DST_MAC_1, SRC_MAC_1, VLAN_ID_1, and MPLS_Label in the content 163 of the relay packet 165 forms a MPLS header.

A search key 152 for a table 1 (151) is:
(1) VLAN_ID.

An action 153 corresponding to the search key 152 is an operation of:
(1) rewriting VLAN_ID into Outer_VID;
(2) adding Inner_VID; and
(3) storing VLAN_ID as another temporary information 155.

A search key 157 of a table 2 (156) includes:
(1) DST_MAC; and
(2) temporary information (VLAN_ID).

An action 158 corresponding to the search key 157 is an operation of:
(1) PUSHing MPLS L2VPN to add (encap) a Shim header; and
(2) determining a port number (Port_num).

An L2-VPN is a VPN through which a provider offers a layer 2 connection between customer sites, for example.

PUSH means an operation of labeling by an LER located at an ingress of an MPLS network and performing forwarding.

A Shim header is a MPLS header (MPLS Label header) of 20 bits provided between a data link header and an IP header and including a label.

Figure 19:
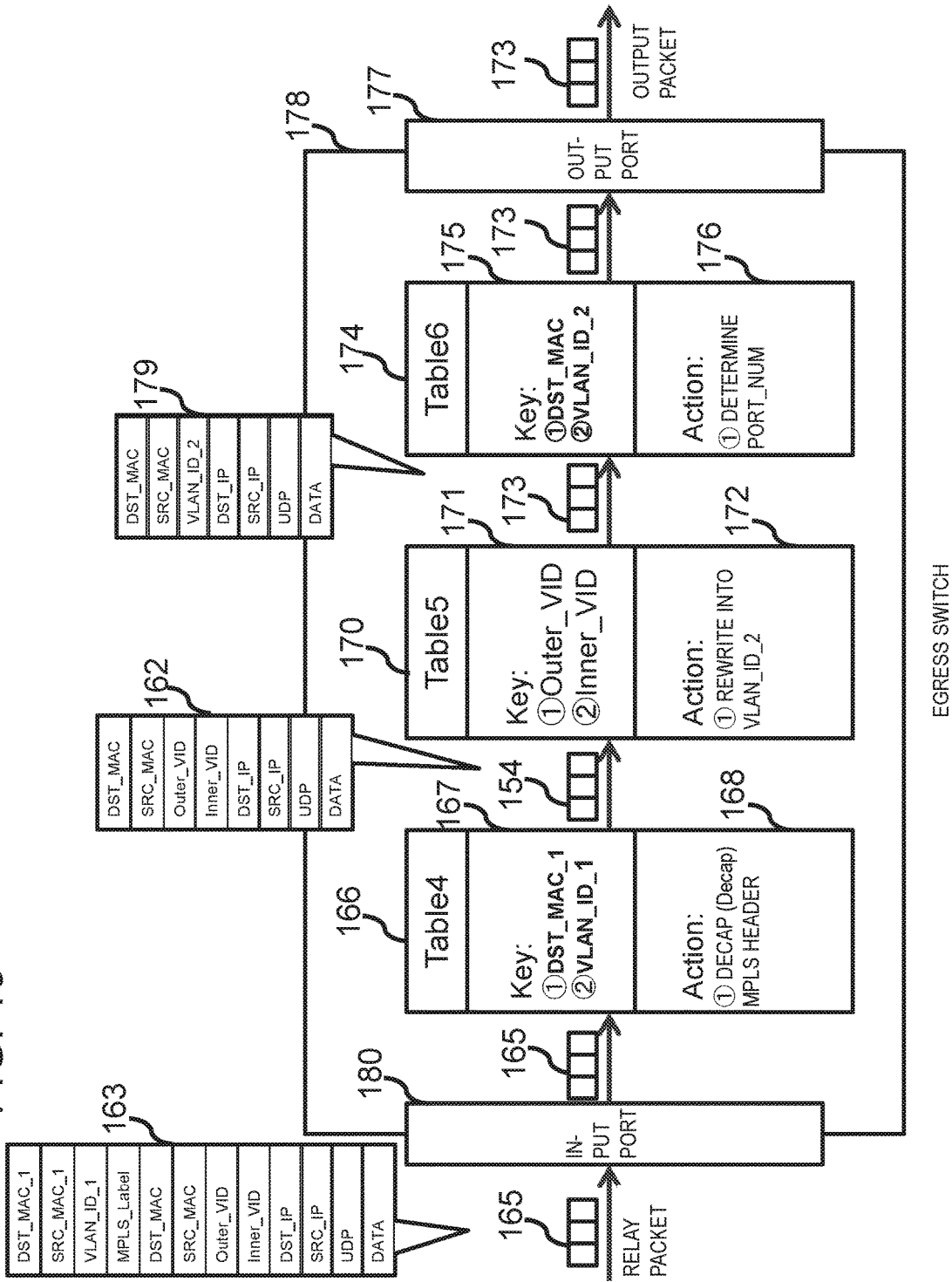
FIG. 19 is a diagram illustrating a table configuration of an egress switch in an exemplary embodiment of the present invention.
Figure 20:
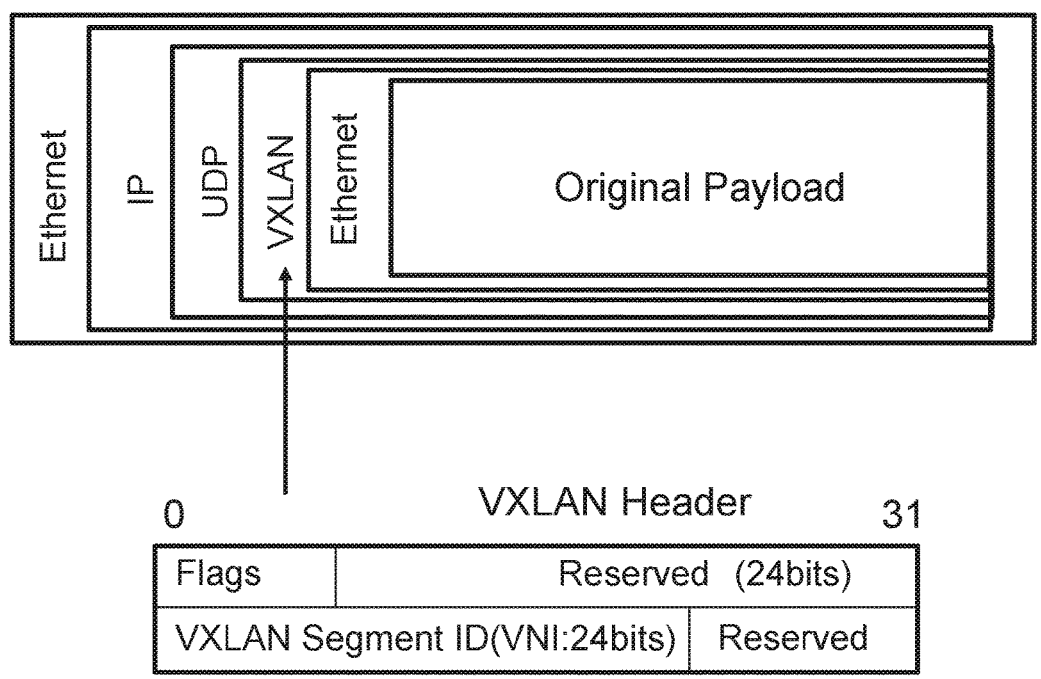
FIG. 20 is a diagram illustrating a concept of a VXLAN packet format.

FIG. 19 is a diagram illustrating a configuration of an egress switch 178 in a second exemplary embodiment. Referring to FIG. 19, the egress switch 178 includes an input port 180 and an output port 177, as input and output interfaces for the relay packet 165 which is a packet supplied to the egress switch 178. The relay packet received is the QinQ packet to which the MPLS header has been added. A content of the relay packet 160 are indicated by the reference sign 163 (the relay packet 165 includes DST_MAC_1, SRC_MAC_1, VLAN_ID_1, MPLS_Label, DST_MAC, SRC_MAC, Outer_VID, Inner_VID, VLAN_ID, DST_IP, SRC_IP, UDP, and the DATA). Of these, DST_MAC_1, SRC_MAC_1, VLAN_ID_1, and MPLS_Label form a MPLS header.

The packet 154 is the QinQ packet including the Outer_VID and the Inner_VID. The content of the packet 154 is indicated by the reference sign 162 (the packet 154 includes DST_MAC, SRC_MAC, Outer_VID, Inner_VID, VLAN_ID, DST_IP, SRC_IP, UDP, and the DATA).

A packet 173 is an output packet. A content of the packet 173 is indicated by a reference sign 179 (the packet 173 includes DST_MAC, SRC_MAC, VLAN_ID_2, DST_IP, SRC_IP, UDP, and the DATA).

A search key 167 for a table 4 (166) includes:
(1) DST_MAC_1; and
(2) VLAN_ID_1.

An action 168 corresponding to the search key 167 is an operation of:
(1) decapsulating (decap) an MPLS header of the packet 165.

A search key 171 of a table 5 (170) includes:
(1) Outer_VID (outer information: packet addressed to itself); and
(2) Inner_VID.

An action 172 corresponding to the search key 171 is an operation of:
(1) rewriting Outer_VID into VLAN_ID_2 and removing Inner_VID.

A search key 175 of a table 6 (174) includes:
(1) destination MAC address (DST_MAC); and
(2) VLAN_ID_2.

An action 176 corresponding to the search key 175 is an operation of:
(1) determining a port number PORT_NUM for output.

<Operations of Ingress Switch 160>

Operations of the ingress switch 160 illustrated in FIG. 18 will be described. In an ingress switch 160, an input packet 149 is forwarded to a table 1 (151) through an input port 150. When VLAN_ID of the input packet 149 hits (Hits) a search key 152 of an entry in the table 1 (151), an action 153 of this entry is executed. First, VLAN_ID of the packet 149 is rewritten into Outer_VID.

Next, Inner_VID is added. Finally, the VLAN_ID is stored in a form of temporary information 155. A packet 154 obtained by rewriting according to the action 153 of the table 1 (151) is transmitted to a table 2 (156) together with the temporary information 155.

When the packet 154 and the temporary information 155 hit a search key 157 of an entry in the table 2 (156), an action 158 of this entry is executed.

According to the action 158, MPLS L2VPN is PUSHed to add a Shim header to the packet 154.

An output port number of a relay packet 165 is determined.

Finally, the relay packet 165 is output from the output port that has been specified.

<Operations of Egress Switch 178>

Next, operations of the egress switch 178 illustrated in FIG. 19 will be described. In an egress switch 178, the relay packet 165 is forwarded to a table 4 (165) through an input port 180 of the egress switch 178. When header information (DST_MAC_1, VLAN_ID_1) of the relay packet 165 hits (Hits) a search key 167 of an entry in the table 4 (166), an action 168 of this entry is executed.

According to the action 168, an MPLS Shim header is decapsulated (decap) from the relay packet 165, and a resulting packet becomes a packet 154.

When Outer_VID and Inner_VID of the packet 154 hit (Hit) a search key 171 of an entry in the table 5 (170), Outer_VID is rewritten into VLAN_ID_2 and Inner_VID is removed, according to an corresponding action 172.

The packet 154 is converted to an output packet 173 according to the table 5 (170).

When DST_MAC and VLAN_ID_2 used as a key hit (Hit) a search key 175 of a table 6 (174), an output port number PORT-NUM is determined according to an action 176 in view of DST_MAC and VLAN_ID_2 of the output packet 173.

Finally, the output packet 173 obtained by conversion according to the action 176 in the table 6 (174) is output from an output port 177.

In the second exemplary embodiment as well, when an action at the ingress/egress of the network is implemented as an action resulted from searches of tables, the number of necessary action patterns can be reduced, and accommodation of the actions resources can be expanded.

Though no particular limitation is limited, the ingress switch and the egress switch in each of the above-mentioned exemplary embodiments may as a matter of course be configured as OFSs (OpenFlow Switches), for example.

Each disclosure of the above-listed Patent Literatures is incorporated herein by reference. Modification and adjustment, of each exemplary embodiment and each example are possible within the scope of the overall disclosure (including the claims) of the present invention and based on the basic technical concept of the present invention. Various combinations and selections of various disclosed elements (including each element of each claim, each element of each example, each element of each drawing, and the like) are possible within the scope of the claims of the present invention. That is, the present invention naturally includes various variations and modifications that could be made by those skilled in the art according to the overall disclosure including the claims and the technical concept.

The invention claimed is:

1. A network control method comprising:

preparing in a switch a plurality of stages of tables that include at least a first table and a second table and that are different to each other in mapping of egress information of a network and user information to a packet, the table being searched whether predetermined information of a packet matches a search key of an entry in the table to perform an operation defined in an action corresponding to the search key matched;

searching the first table for a first packet received, applying to the first packet an operation according to an action corresponding to a search key in the first table to convert the first packet to a second packet, when the first packet matches the search key in the first table, and supplying the second packet to the second table; and searching the second table for the second packet, applying to the second packet an operation according to an action corresponding to a search key in the second table to convert the second packet to a third packet, when the second packet matches the search key in the second table, the method further comprising:

in a switch on an ingress side of the network, mapping local user information of the first packet to global user information, as the operation applied to the first packet according to the first table to output the second packet with the global user information;

mapping from the global user information of the second packet to destination information, as the operation applied to the second packet according to the second table to output the third packet with the destination information; and determining output based on the destination information of the third packet, as an operation applied to the third packet according to a third table provided in a stage subsequent to the second table.

2. The network control method according to claim 1, comprising
the global user information being handed over between the first table and the second table.

3. A network control method comprising:
preparing in a switch a plurality of stages of tables that include at least a first table and a second table and that are different to each other in mapping of egress information of a network and user information to a packet, the table being searched whether predetermined information of a packet matches a search key of an entry in the table to perform an operation defined in an action corresponding to the search key matched;
searching the first table for a first packet received, applying to the first packet an operation according to an action corresponding to a search key in the first table to convert the first packet to a second packet, when the first packet matches the search key in the first table, and supplying the second packet to the second table; and
searching the second table for the second packet, applying to the second packet an operation according to an action corresponding to a search key in the second table to convert the second packet to a third packet, when the second packet matches the search key in the second table,
the method further comprising:
in a switch on an egress side of the network,
decapsulating outer information of the first packet by referencing the outer information in the first table as the operation applied to the first packet according to the first table to output the second packet;
(A) mapping global user information of the second packet to local user information, as the operation applied to the second packet according to the second table; and
determining a final destination based on information of the second packet, for output, as the operation applied to the second packet using a third table in a stage subsequent to the second table; or
in an order reverse to (A),
(B) determining destination using global user information of the second packet, as the operation applied to the second packet according to a third table; and
then converting the global user information of the second packet to local user information, as the operation applied to the second packet according to the second table.

4. The network control method according to claim 3, comprising
consolidating actions in the second table and the third table in the switch on the ingress side into one table to allow the actions in the one table to be concurrent executed.

5. A network system comprising at least one switch including:
a plurality of stages of tables that includes at least a first table and a second table and that are different in mapping of egress information of a network and user information to a packet, the table being searched whether predetermined information of a packet matches a search key of an entry in the table to perform an operation defined in an action corresponding to the search key matched,
wherein the switch searches the first table for a first packet received, applies to the first packet an operation according to an action corresponding to a search key of the first table to convert the first packet to a second packet when first packet matches the search key of the first table, and supplies the second packet to the second table, and
wherein the switch searches the second table for the second packet and applies to the second packet an operation according to an action corresponding to a search key of the second table to convert the second packet to a third packet, when the second packet matches the search key of the second table,
the system further comprising, as the switch,
a switch on an ingress side of the network that:
performs mapping of local user information to global user information, as the operation applied to the first packet according to the first table to output the second packet with the global user information;
performs mapping from the global user information of the second packet to destination information, as the operation applied to the second packet according to the second table to output the third packet with the destination information; and
determines an output based on destination information of the third packet, as the operation applied to third second packet according to a third table in a stage subsequent to the second table.

6. A network system comprising at least one switch including:
a plurality of stages of tables that includes at least a first table and a second table and that are different in mapping of egress information of a network and user information to a packet, a table of the tables being searched whether predetermined information of a packet matches a search key of an entry in the table to perform an operation defined in an action corresponding to the search key matched,
wherein the switch searches the first table for a first packet received, applies to the first packet an operation according to an action corresponding to a search key of the first table to convert the first packet to a second packet when first packet matches the search key of the first table, and supplies the second packet to the second table, and
wherein the switch searches the second table for the second packet and applies to the second packet an operation according to an action corresponding to a search key of the second table to convert the second packet to a third packet, when the second packet matches the search key of the second table,
the system further comprising, as the switch,
a switch on an egress side of the network that decapsulates outer information of the first packet by referencing the outer information as the operation applied to the first packet according to the first table to output the second packet;
(A) performs mapping of global user information of the second packet to local user information, as the operation applied to the second packet according to the second table; and
determines a final destination based on the information of the second packet, for output, as the operation applied to the second packet according to a third table in a stage subsequent to the second table; or
in an order reverse to (A),
(B) determines a destination based on global user information of the second packet, as the operation applied to the second packet according to a third table; and then converts the global user information of the second packet to local user information, as the operation applied to the second packet according to the second table.

7. A switch apparatus comprising:
a plurality of stages of tables that includes at least a first table and a second table and that are different in mapping of egress information of a network and user information to a packet, a table of the tables being searched whether predetermined information of a packet matches a search key of an entry in the table of the tables to perform an operation defined in an action corresponding to the search key matched,
wherein the switch includes:
a unit that searches the first table for a first packet received, applies to the first packet an operation according to an action corresponding to a search key of the first table to convert the first packet to a second packet when first packet matches the search key of the first table, and supplies the second packet to the second table, and
a unit that searches the second table for the second packet and applies to the second packet an operation according to an action corresponding to a search key of the second table to convert the second packet to a third packet, when the second packet matches the search key of the second table, wherein the switch apparatus is provided on an ingress side of the network, and wherein the switch apparatus includes:
a unit that performs mapping of local user information of the first packet to global user information, as the operation applied to the first packet according to the first table and outputs the second packet with the global user information;
a unit that performs mapping from the global user information of the second packet to destination information, as the operation applied to the second packet according to the second table to output the third packet with the destination information; and
a unit that determines output based on the destination information of the third packet, as an operation applied to the third packet according to a third table provided in a stage subsequent to the second table.

8. The switch apparatus according to claim 7, wherein the global user information is handed over between the first table and the second table.

9. A switch apparatus comprising:
a plurality of stages of tables that includes at least a first table and a second table and that are different in mapping of egress information of a network and user information to a packet, a table of the tables being searched whether predetermined information of a packet matches a search key of an entry in the table to perform an operation defined in an action corresponding to the search key matched,
wherein the switch includes:
a unit that searches the first table for a first packet received, applies to the first packet an operation according to an action corresponding to a search key of the first table to convert the first packet to a second packet when first packet matches the search key of the first table, and supplies the second packet to the second table, and
a unit that searches the second table for the second packet and applies to the second packet an operation according to an action corresponding to a search key of the second table to convert the second packet to a third packet, when the second packet matches the search key of the second table, wherein the switch apparatus is provided on an egress side of the network, and wherein the switch apparatus includes:
a unit that decapsulates outer information of the first packet by referencing the outer information in the first table as the operation applied to the first packet according to the first table to output the second packet;
(A) performs mapping global user information of the second packet to local user information, as the operation applied to the second packet according to the second table; and
determines a final destination based on information of the second packet, for output, as the operation applied to the second packet using a third table in a stage subsequent to the second table; or
in an order reverse to (A),
(B) determines destination using global user information of the second packet, as the operation applied to the second packet according to a third table; and
then converts the global user information of the second packet to local user information, as the operation applied to the second packet according to the second table.

10. The switch apparatus according to claim 9, wherein actions in the second table and the third table in the switch on the ingress side are consolidated into one table to allow the actions in the one table to be concurrent executed.

11. A non-transitory computer-readable storage medium with an executable program stored thereon, wherein the program instructs a computer of a switch comprising a plurality of stages of tables that includes at least a first table and a second table and that are different in mapping of egress information of a network and user information to a packet, a table being searched whether predetermined information of a packet matches a search key of an entry in the table of the tables to perform an operation defined in an action corresponding to the search key matched, to perform processing comprising:
searching the first table for a first packet received, applying to the first packet an operation according to an action corresponding to a search key of the first table to convert the first packet to a second packet when the first packet matches the search key of the first table; and
searching the second table for the second packet and applying to the second packet an operation according to an action corresponding to a search key of the second table to convert the second packet to a third packet when the second packet matches the search key of the second table wherein the executable program stored thereon is configured to instruct the computer of the switch on an ingress side of the network to perform the processing comprising:
mapping local user information of the first packet to global user information, as the operation applied to the first packet according to the first table to output the second packet with the global user information;
mapping from the global user information of the second packet to destination information, as the operation applied to the second packet according to the second table to output the third packet with the destination information; and
determining output based on the destination information of the third packet, as an operation applied to the third packet according to a third table provided in a stage subsequent to the second table.

12. A non-transitory computer-readable storage medium with an executable program stored thereon, wherein the program instructs a computer of a switch comprising a plurality of stages of tables that includes at least a first table and a second table and that are different in mapping of egress information of a network and user information to a packet, a table of the tables being searched whether predetermined information of a packet matches a search key of an entry in the table of the tables to perform an operation defined in an action corresponding to the search key matched, to perform processing comprising:
  searching the first table for a first packet received, applying to the first packet an operation according to an action corresponding to a search key of the first table to convert the first packet to a second packet when the first packet matches the search key of the first table; and
  searching the second table for the second packet and applying to the second packet an operation according to an action corresponding to a search key of the second table to convert the second packet to a third packet when the second packet matches the search key of the second table, wherein the executable program stored thereon is configured to instruct the computer of the switch on an egress side of the network to perform the processing comprising:
  decapsulating outer information of the first packet by referencing the outer information in the first table as the operation applied to the first packet according to the first table to output the second packet;
  (A) mapping global user information of the second packet to local user information, as the operation applied to the second packet according to the second table; and
  determining a final destination based on information of the second packet, for output, as the operation applied to the second packet using a third table in a stage subsequent to the second table; or in an order reverse to (A),
  (B) determining destination using global user information of the second packet, as the operation applied to the second packet according to a third table; and
  then converting the global user information of the second packet to local user information, as the operation applied to the second packet according to the second table.

* * * * *